US012658119B2

(12) United States Patent
Gai et al.

(10) Patent No.: US 12,658,119 B2
(45) Date of Patent: Jun. 16, 2026

(54) PIXEL CIRCUIT, DRIVING METHOD THEREFOR, AND DISPLAY PANEL

(71) Applicant: KunShan Go-Visionox Opto-Electronics Co., Ltd, Kunshan (CN)

(72) Inventors: Cuili Gai, Kunshan (CN); Enqing Guo, Kunshan (CN); Kangguan Pan, Kunshan (CN); Shuang Guo, Kunshan (CN); Junfeng Li, Kunshan (CN); Rubo Xing, Kunshan (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 0 days.

(21) Appl. No.: 19/171,331

(22) Filed: Apr. 6, 2025

(65) Prior Publication Data

US 2025/0232717 A1 Jul. 17, 2025

Related U.S. Application Data

(63) Continuation of application No. PCT/CN2023/095034, filed on May 18, 2023.

(30) Foreign Application Priority Data

Oct. 12, 2022 (CN) ......................... 202211245823.1

(51) Int. Cl.
*G09G 3/32* (2016.01)

(52) U.S. Cl.
CPC ......... *G09G 3/32* (2013.01); *G09G 2300/043* (2013.01); *G09G 2300/0819* (2013.01);
(Continued)

(58) Field of Classification Search
CPC ...... G09G 3/3233; G09G 3/32; G09G 3/3208; G09G 2320/0233; G09G 2300/0819; G09G 2300/0842
See application file for complete search history.

(56) References Cited

U.S. PATENT DOCUMENTS

2017/0140707 A1 5/2017 Xu et al.
2017/0162113 A1 6/2017 Lin et al.
(Continued)

FOREIGN PATENT DOCUMENTS

CN 104715726 A 6/2015
CN 107230455 A 10/2017
(Continued)

OTHER PUBLICATIONS

International Search Report of Application No. PCT/CN2023/095034.
(Continued)

*Primary Examiner* — Koosha Sharifi-Tafreshi
(74) *Attorney, Agent, or Firm* — Kilpatrick Townsend & Stockton LLP

(57) ABSTRACT

A pixel circuit, a driving method therefor and a display panel are disclosed. The pixel circuit is configured to include a reset module, where the reset module is electrically connected to a first terminal or a second terminal of a driving module; and the reset module resets potentials of the first terminal and the second terminal of the driving module between a data writing stage and a light emission stage of a writing frame, and resets the potentials of the first terminal and the second terminal of the driving module before a light emission stage of an idle frame.

20 Claims, 15 Drawing Sheets

(52) U.S. Cl.
CPC ............... *G09G 2300/0852* (2013.01); *G09G 2310/061* (2013.01); *G09G 2310/08* (2013.01); *G09G 2320/0233* (2013.01)

(56) References Cited

U.S. PATENT DOCUMENTS

| | | | | |
|---|---|---|---|---|
| 2021/0150985 | A1* | 5/2021 | Li | G09G 3/2003 |
| 2021/0287614 | A1* | 9/2021 | Xiong | G09G 3/3291 |

FOREIGN PATENT DOCUMENTS

| | | | |
|---|---|---|---|
| CN | 112116890 | A | 12/2020 |
| CN | 112509519 | A | 3/2021 |
| CN | 112735314 | A | 4/2021 |
| CN | 213277408 | U | 5/2021 |
| CN | 113763888 | A | 12/2021 |
| CN | 113950715 | A | 1/2022 |
| CN | 114078445 | A | 2/2022 |
| CN | 114420034 | A | 4/2022 |
| CN | 114758613 | A | 7/2022 |
| CN | 115331609 | A | 11/2022 |

OTHER PUBLICATIONS

First Office Action of Application No. CN 202211245823.1.
Notice of Registration of Application No. CN 202211245823.1.

* cited by examiner

PIXEL CIRCUIT, DRIVING METHOD THEREFOR, AND DISPLAY PANEL

CROSS-REFERENCE TO RELATED APPLICATIONS

This application is a continuation of International Patent Application No. PCT/CN2023/095034, filed on May 18, 2023, which claims priority to Chinese Patent Application No. 202211245823.1, filed on Oct. 12, 2022, disclosures of both of which are incorporated herein by reference in their entireties.

FIELD

Embodiments of the present application relate to the field of display technologies, and for example, to a pixel circuit and a driving method therefor.

BACKGROUND

With the development of display technologies, users' requirements for display quality are also increasing.

When a display apparatus is in operation, it may have different operating modes, and refresh rates vary among different operating modes. For example, the refresh rate of the display apparatus differs when displaying static images versus displaying dynamic scenes from a game. In different operating modes, the display apparatus needs to switch between refresh rates.

However, during refresh rate switching, the image display quality of a display apparatus is poor.

SUMMARY

The present application provides a pixel circuit and a driving method therefor to improve display quality during refresh rate switching.

According to one embodiment of the present application provides a pixel circuit, including: a data writing module, a driving module, a compensation module, a light emission control module, and a light-emitting module, where the data writing module is configured to write a data voltage to a control terminal of the driving module in a data writing stage of a writing frame;

the compensation module is configured to compensate for a threshold voltage of the driving module in the data writing stage of the writing frame; and the light emission control module is configured to be turned on in light emission stages of the writing frame and an idle frame, and the driving module is configured to drive the light-emitting module to emit light in the light emission stages; and the pixel circuit further including a reset module, where the reset module is electrically connected to a first terminal of the driving module or a second terminal of the driving module, and the reset module is configured to reset potentials of the first terminal of the driving module and the second terminal of the driving module to a fixed reset voltage in a reset stage, where in the writing frame, the reset stage is between the data writing stage and the light emission stage; and in the idle frame, the reset stage precedes the light emission stage.

According to another an embodiment of the present application further provides a driving method for a pixel circuit, including:

in a writing frame, writing, by a data writing module, a data voltage to a control terminal of a driving module in a data writing stage, and compensating, by a compensation module, for a threshold voltage of the driving module in a data writing stage of the writing frame; and resetting, by a reset module, potentials of a first terminal of the driving module and a second terminal of the driving module to a fixed reset voltage in a reset stage, turning on a light emission control module in a light emission stage, and driving, by the driving module, the light-emitting module to emit light in the light emission stage; and in an idle frame, resetting, by the reset module, the potentials of the first terminal of the driving module and the second terminal of the driving module to the fixed reset voltage in the reset stage, turning on the light emission control module in the light emission stage, and driving, by the driving module, the light-emitting module to emit light in the light emission stages, where in the writing frame, the reset stage is between the data writing stage and the light emission stage; and in the idle frame, the reset stage precedes the light emission stage.

According to yet another an embodiment of the present application further provides a display panel, including the pixel circuit in the embodiments.

The pixel circuit and the driving method therefor in the embodiments of the present application achieve improvement of the display quality by configuring the pixel circuit to include a reset module. The reset module is electrically connected to the first terminal or the second terminal of the driving module. The reset module resets the potentials of the first terminal and the second terminal of the driving module between the data writing stage and the light emission stage of the writing frame, and resets the potentials of the first terminal and the second terminal of the driving module before the light emission stage of the idle frame. Consequently, the potentials of the first terminal of the driving module before the light emission stages of the writing frame and the idle frame are the same, and the potentials of the second terminal of the driving module before the light emission stages of the writing frame and the idle frame are also the same. As a result, the bias states of the driving module before the light emission stages of the writing frame and the idle frame are the same, thereby facilitating the improvement of the transient characteristics of the driving module. This ensures that the brightness of the light-emitting module does not abruptly change during refresh rate switching, and the brightness of the light-emitting module does not abruptly change during the writing frame and the idle frame in low-frequency display, thereby contributing to the improvement of the display quality.

DETAILED DESCRIPTION

The present application is described in detail below with reference to the accompanying drawings and embodiments.

During refresh rate switching, the image display quality of a display apparatus is poor. It has been found through research that the cause of the aforementioned problem is that during display, a lower refresh rate of the display apparatus is achieved by frame skipping on the basis of a higher refresh rate. For example, at a refresh rate of 60 Hz, the 60 data frames are all writing frames, and data is written in each writing frame; and at a refresh rate of 1 Hz, on the basis of 60 Hz, one data frame is used as a writing frame, while the other data frames are used as idle frames. Data is written only in the writing frame, and no data is written in the idle frames. Since in the pixel circuit, driving transistors are required during data writing, the actions of the driving transistors in the writing frame and the idle frame are different, leading to differences in the characteristics of the driving transistor, which results in poor display quality of the display apparatus during refresh rate switching and low-frequency display.

Figure 1:
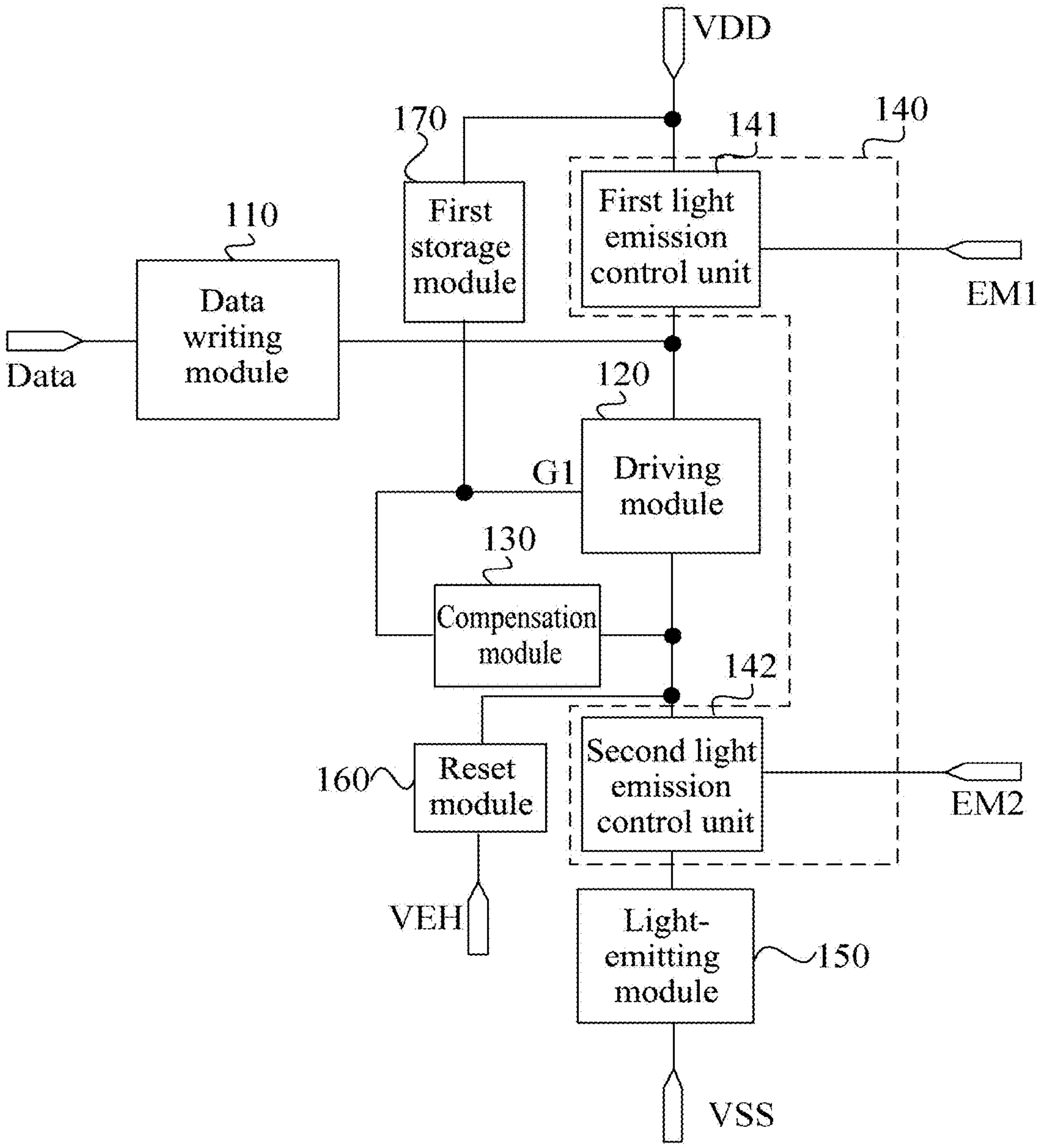
FIG. 1 is a schematic diagram of a structure of a pixel circuit according to an embodiment of the present application.

An embodiment of the present application provides a pixel circuit. FIG. 1 is a schematic diagram of a structure of a pixel circuit according to an embodiment of the present application. With reference to FIG. 1, the pixel circuit includes: a data writing module 110, a driving module 120, a compensation module 130, a light emission control module 140, and a light-emitting module 150, where the data writing module 110 is configured to write a data voltage to a control terminal of the driving module 120 in a data writing stage of a writing frame; the compensation module 130 is configured to compensate for a threshold voltage of the driving module 120 in the data writing stage of the writing frame; and the light emission control module 140 is configured to be turned on in light emission stages of the writing frame and an idle frame, and the driving module 120 is configured to drive the light-emitting module 150 to emit light in the light emission stages; and the pixel circuit further includes a reset module 160, where the reset module 160 is electrically connected to a first terminal or a second terminal of the driving module 120, and the reset module 160 is configured to reset potentials of the first terminal and the second terminal of the driving module 120 to a fixed reset voltage VEH in a reset stage, where in the writing frame, the reset stage is between the data writing stage and the light emission stage; and in the idle frame, the reset stage precedes the light emission stage.

The pixel circuit may operate at different refresh rates, where at a higher refresh rate, each data frame is a writing frame; and at a lower refresh rate, at least one data frame may be used as a writing frame, while the other data frames may be used as idle frames.

With reference to FIG. 1, a first terminal of the data writing module 110 is connected to a data line Data, and a second terminal of the data writing module 110 is connected to the first terminal of the driving module 120; and a first terminal of the compensation module 130 is connected to the second terminal of the driving module 120, and a second terminal of the compensation module 130 is connected to a control terminal G1 of the driving module 120. The light emission control module 140, the driving module 120, and the light-emitting module 150 are connected in series between a first power line VDD and a second power line VSS. The reset module 160 is electrically connected to the first terminal or the second terminal of the driving module 120, thereby achieving the resetting of the potentials at the first terminal and the second terminal of the driving module 120 in a reset stage.

The reset voltage VEH may be set according to the actual screen adjustment effect. For example, during the actual screen adjustment, the magnitude of the reset voltage VEH may be adjusted, and the reset voltage corresponding to the optimal actual screen adjustment effect is set as the final fixed reset voltage of the display panel after the factory delivery, that is, the reset voltage VEH in the pixel circuit in this embodiment.

FIG. 1 schematically illustrates the case where the reset module 160 is electrically connected to the second terminal of the driving module 120. Taking the pixel circuit shown in FIG. 1 as an example, the operating process of the pixel circuit in a writing frame is as follows.

In the data writing stage, the data writing module 110 and the compensation module 130 are turned on, and the light emission control module 140 and the reset module 160 are turned off. The data writing module 110 writes the data voltage to the control terminal G1 of the driving module 120, the compensation module 130 compensates for the threshold voltage of the driving module 120, where the driving module 120 includes a driving transistor DT, and the threshold voltage of the driving module 120 is the threshold voltage of the driving transistor DT.

In the reset stage, the reset module 160 is turned on, and the reset module 160 writes the reset voltage VEH to the second terminal of the driving module 120, and writes the reset voltage VEH to the first terminal of the driving module 120 through the driving module 120. The data writing module 110, the compensation module 130, and the light emission control module 140 are turned off. In other embodiments of the present application, the reset module 160 is connected to the first terminal of the driving module 120, and in the reset stage, the reset module 160 is turned on, and writes the reset voltage VEH to the first terminal of the driving module 120, and writes it to the second terminal of the driving module 120 through the driving module 120.

In the light emission stage, the light emission control module 140 is turned on, and the driving module 120 generates a driving current based on the voltages at its control terminal G1 and first terminal, to drive the light-emitting module 150 to emit light. The data writing module 110, the compensation module 130, and the reset module 160 are turned off.

The operating process of the pixel circuit in an idle frame is as follows.

In the reset stage, the reset module 160 is turned on, and the reset module 160 writes the reset voltage VEH to the second terminal of the driving module 120, and writes the reset voltage VEH to the first terminal of the driving module 120 through the driving module 120. The data writing module 110, the compensation module 130, and the light emission control module 140 are turned off.

In the light emission stage, the light emission control module 140 is turned on, and the driving module 120 generates a driving current based on the voltages at its control terminal G1 and first terminal, to drive the light-emitting module 150 to emit light. The data writing module 110, the compensation module 130, and the reset module 160 are turned off.

The pixel circuit in this embodiment achieve improvement of the display quality by configuring the pixel circuit to include a reset module. The reset module is electrically connected to the first terminal or the second terminal of the driving module. The reset module resets the potentials of the first terminal and the second terminal of the driving module between the data writing stage and the light emission stage of the writing frame, and resets the potentials of the first terminal and the second terminal of the driving module before the light emission stage of the idle frame. Consequently, the potentials of the first terminal of the driving module before the light emission stages of the writing frame and the idle frame are the same, and the potentials of the second terminal of the driving module before the light emission stages of the writing frame and the idle frame are also the same. As a result, the bias states of the driving module before the light emission stages of the writing frame and the idle frame are the same, thereby facilitating the improvement of the transient characteristics of the driving module. This ensures that the brightness of the light-emitting module does not abruptly change during refresh rate switching, and the brightness of the light-emitting module does not abruptly change during the writing frame and the idle frame in low-frequency display, which helps to mitigate the issues of frequency switching and low-frequency flicker, thereby improving the display quality.

Continuing with reference to FIG. 1, in one embodiment, a first terminal of the reset module 160 is connected to the reset voltage VEH, and a second terminal of the reset module 160 is electrically connected to the second terminal of the driving module 120, and the reset module 160 is configured to, under the control of a signal applied to its control terminal, write the reset voltage VEH to the first terminal and the second terminal of the driving module 120 in the reset stage.

In the reset stage, a valid control signal is input to the control terminal of the reset module 160, causing the reset module 160 to be turned on, and the reset voltage VEH is written to the second terminal of the driving module 120 through the reset module 160. To ensure that the driving module 120 can be turned on in the reset stage and the reset voltage VEH can be written from the second terminal of the driving module 120 to the first terminal of the driving module 120, the magnitude of the reset voltage VEH can be set.

In an embodiment, the driving transistor DT is a P-type transistor, and the reset voltage VEH is higher than the data voltage, and the driving transistor DT can be turned on in the reset stage, ensuring that the reset voltage VEH can be written from the second terminal of the driving module 120 to the first terminal of the driving module 120.

In another embodiment, the driving transistor DT is an N-type transistor, and the reset voltage VEH is lower than the data voltage, and the driving transistor DT can be turned on in the reset stage, ensuring that the reset voltage VEH can be written from the second terminal of the driving module 120 to the first terminal of the driving module 120.

Continuing with reference to FIG. 1, in one embodiment, the light emission control module 140 includes a first light emission control unit 141 and a second light emission control unit 142, where the first light emission control unit 141 is connected in series between a first power line VDD and the first terminal of the driving module 120; and the second light emission control unit 142 is connected in series between the second terminal of the driving module 120 and a first terminal of the light-emitting module 150, with a second terminal of the light-emitting module 150 being electrically connected to a second power line VSS.

In the pixel circuit shown in FIG. 1, the reset module 160 is a module newly added on the basis of the data writing module 110, the driving module 120, the compensation module 130, the light emission control module 140, and the light-emitting module 150 that are included in the pixel circuit. In other embodiments of the present application, the reset module 160 may be formed using parts of the data writing module 110, the driving module 120, the compensation module 130, the light emission control module 140, and the light-emitting module 150 that are included in the pixel circuit.

Figure 2:
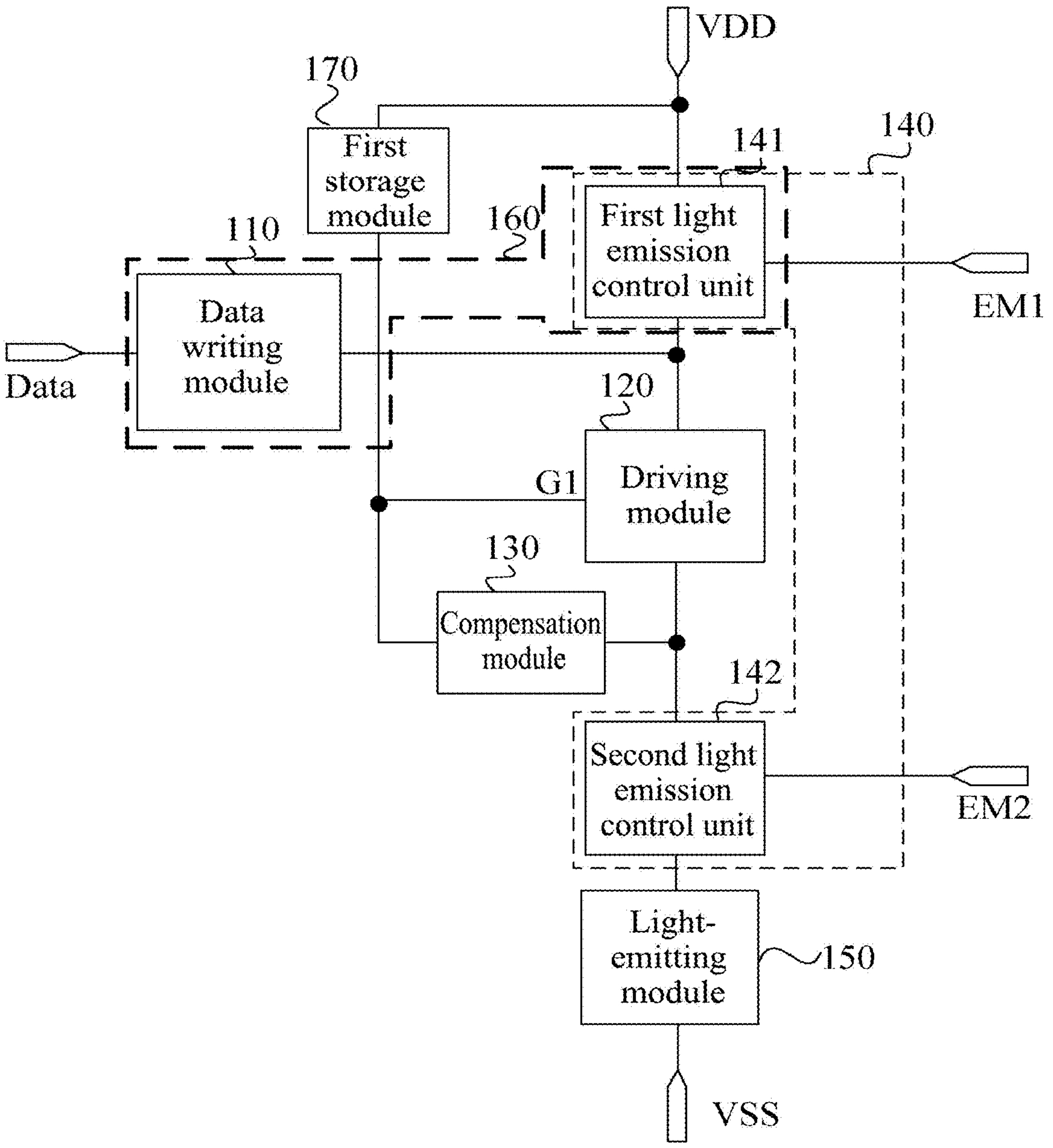
FIG. 2 is a schematic diagram of a structure of another pixel circuit according to an embodiment of the present application.

FIG. 2 is a schematic diagram of a structure of another pixel circuit according to an embodiment of the present application. With reference to FIG. 2, in one embodiment, the light emission control module 140 includes a first light emission control unit 141 and a second light emission control unit 142, where the first light emission control unit 141 is connected in series between a first power line VDD and the first terminal of the driving module 120; and the second light emission control unit 142 is connected in series between the second terminal of the driving module 120 and a first terminal of the light-emitting module 150, with a second terminal of the light-emitting module 150 being electrically connected to a second power line VSS.

A first terminal of the data writing module 110 is electrically connected to a data line Data, and a second terminal of the data writing module 110 is electrically connected to the first terminal of the driving module 120; and the data line Data is configured to transmit the data voltage in the data writing stage of the writing frame and transmit a first power supply voltage in the reset stage of an idle frame.

The reset module 160 includes the first light emission control unit 141 and the data writing module 110, where the first light emission control unit 141 is configured to write the first power supply voltage to the first terminal and the second terminal of the driving module 120 in the reset stage of the writing frame; and the data writing module 110 is configured to write the first power supply voltage to the first terminal and the second terminal of the driving module 120 in the reset stage of the idle frame, that is, in the reset stage of the idle frame, the voltage input to an input terminal of the data writing module 110 is the first power supply voltage.

In the working process of the pixel circuit shown in FIG. 2 in the writing frame, the operating processes of the data writing stage and the light emission stage are respectively the same as those of the pixel circuit shown in FIG. 1 in the data writing stage and the light emission stage of the writing frame.

In the reset stage of the pixel circuit shown in FIG. 2 in the writing frame, the first light emission control unit 141 is turned on, the first light emission control unit 141 writes the first power supply voltage to the first terminal of the driving module 120, and writes the first power supply voltage to the second terminal of the driving module 120 through the driving module 120. The data writing module 110, the compensation module 130, and the second light emission control unit 142 are turned off.

The operating process of the pixel circuit in an idle frame is as follows.

In the reset stage, the data writing module 110 is turned on, the data writing module 110 writes the first power supply voltage to the first terminal of the driving module 120, and writes the first power supply voltage to the second terminal of the driving module 120 through driving module 120. The compensation module 130, the first light emission control unit 141, and the second light emission control unit 142 are turned off.

The operating process in the light emission stage is the same as that of the pixel circuit shown in FIG. 1 in the light emission stage of the idle frame, which will not be repeated here.

In this embodiment, the voltage applied to the input terminal of the data writing module 110 is not fixed. In the writing frame, the voltage applied to the input terminal of the data writing module 110 is the data voltage, while in the idle frame, the voltage input to the input terminal of the data writing module 110 is the first power supply voltage.

In this embodiment, the reset module 160 is formed using the existing structure in the pixel circuit, and there is no need to add additional circuit modules on the basis of the data writing module 110, the driving module 120, the compensation module 130, the light emission control module 140, and the light-emitting module 150 in the pixel circuit. This reduces the number of devices included in the pixel circuit while improving the display quality, which is beneficial for increasing the pixel density.

Figure 3:
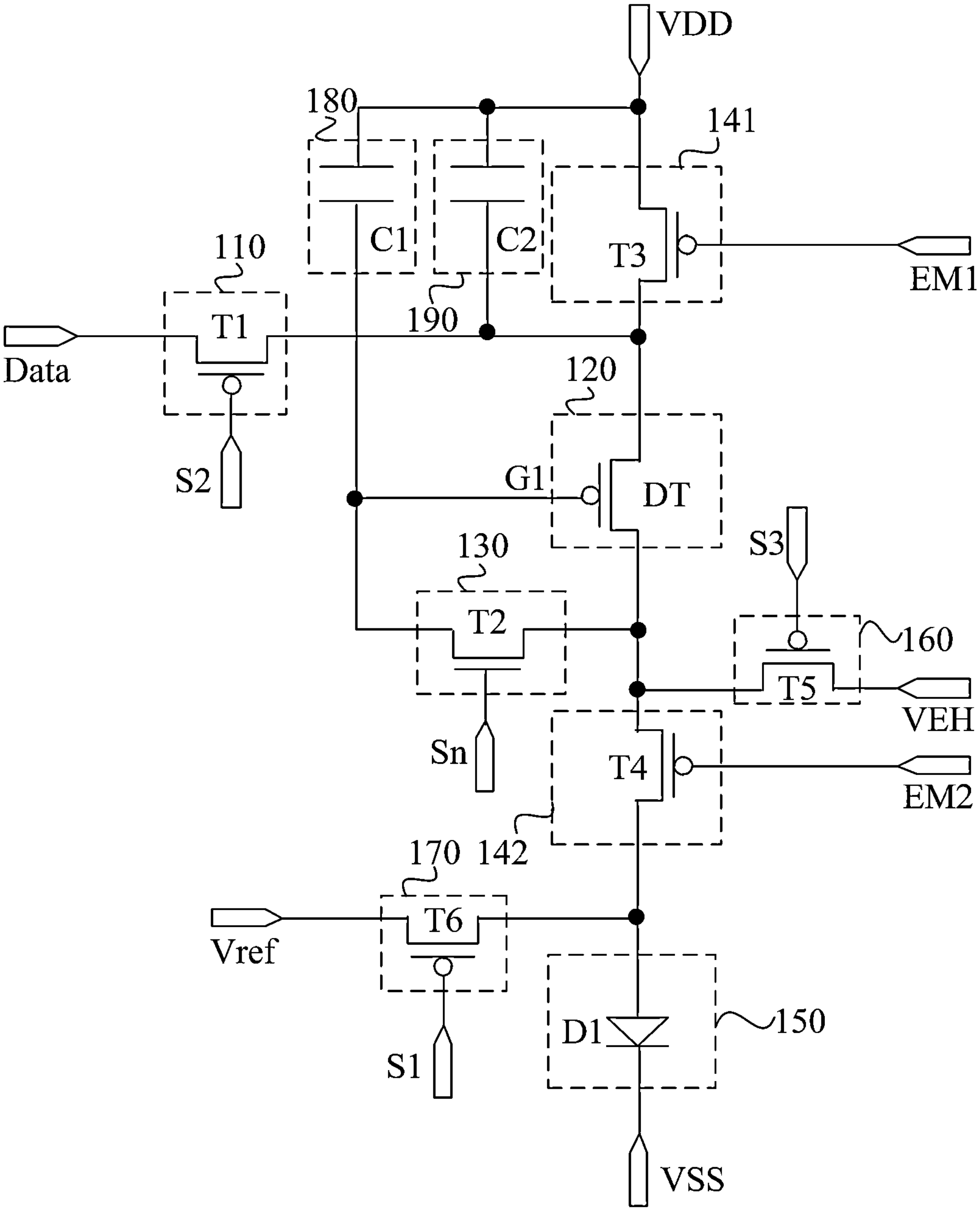
FIG. 3 is a schematic diagram of a structure of another pixel circuit according to an embodiment of the present application.
Figure 4:
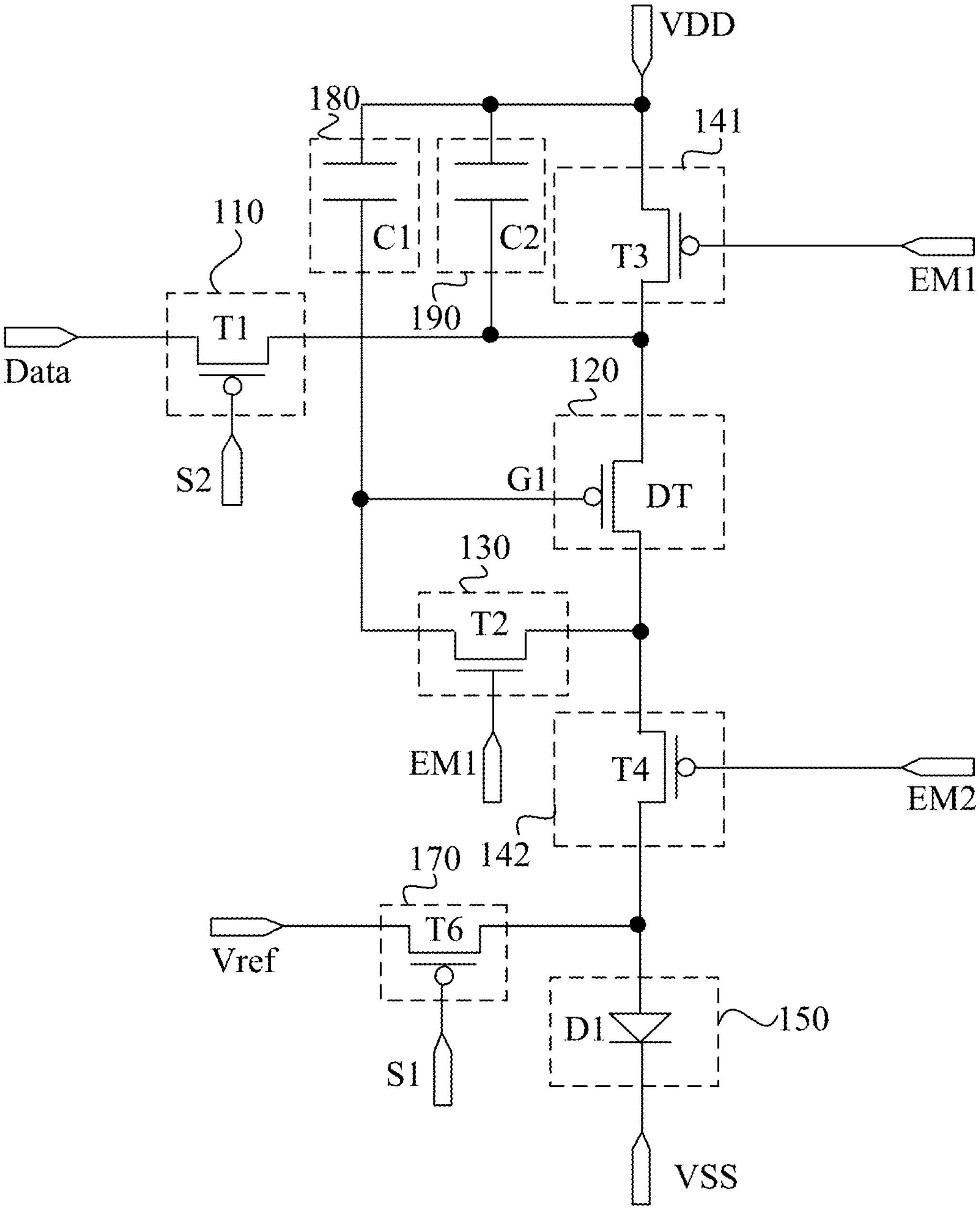
FIG. 4 is a schematic diagram of a structure of another pixel circuit according to an embodiment of the present application.

In one embodiment, on the basis of the pixel circuits shown in FIG. 1 and FIG. 2, in one embodiment, the pixel circuit further includes an initialization module. FIG. 3 is a schematic diagram of a structure of another pixel circuit according to an embodiment of the present application, and FIG. 4 is a schematic diagram of a structure of another pixel circuit according to an embodiment of the present application. FIG. 3 shows a structure of a pixel circuit with an initialization module 170 added on the basis of the pixel circuit shown in FIG. 1, and FIG. 4 shows a structure of a pixel circuit with an initialization module 170 added on the basis of the pixel circuit shown in FIG. 2. With reference to FIG. 3 and FIG. 4, in one embodiment, the initialization module 170 is configured to write an initialization voltage to the first terminal of the light-emitting module 150 and the control terminal of the driving module 120 in a first initialization stage of the writing frame, and the second light emission control unit 142 and the compensation module 130 are configured to be turned on in the first initialization stage of the writing frame, to write the initialization voltage written to the first terminal of the light-emitting module 150 to the control terminal of the driving module through the second light emission control unit 142 and the compensation module 130, where in the writing frame, the first initialization stage precedes the data writing stage.

In one embodiment, the initialization module 170 is further configured to write the initialization voltage to the first terminal of the light-emitting module 150 in a first initialization stage of the idle frame, where in the idle frame, the first initialization stage precedes the reset stage.

The operating processes of the pixel circuits shown in FIG. 3 and FIG. 4 in the writing frame and the idle frame all include the first initialization stage. In the first initialization stage of the writing frame, the initialization module 170 is turned on, and then writes the initialization voltage to the first terminal of the light-emitting module 150, achieving the initialization of the light-emitting module 150. At the same time, the second light emission control unit 142 and the compensation module 130 are turned on, and the initialization voltage is written to the control terminal of the driving module 120 through the initialization module 170, the second light emission control unit 142, and the compensation module 130, achieving the initialization of the control terminal of the driving module 120. In the first initialization stage of the idle frame, the initialization module 170 is turned on, and writes the initialization voltage to the first terminal of the light-emitting module 150, thereby ensuring that the light-emitting module 150 does not emit light during black insertion in the idle frame, which is beneficial for improving the display quality.

For the pixel circuit shown in FIG. 4, the first light emission control unit 141 and the second light emission control unit 142 may also be turned on in the first initialization stage of the idle frame, and there is a large current between the first power line and an initialization line Vref in the first initialization stage of the idle frame. This helps to reduce image retention, thereby improving the display quality.

Continuing with reference to FIG. 3 and FIG. 4, in one embodiment, the control terminal of the initialization module 170 is connected to a first scan line S1, a first terminal of the initialization module 170 is connected to the initialization line Vref, and a second terminal of the initialization module 170 is connected to the first terminal of the light-emitting module 150; and a control terminal of the data writing module 110 is connected to a second scan line S2, a first terminal of the data writing module 110 is connected to the data line Data, and a second terminal of the data writing module 110 is connected to the first terminal of the driving module 120. The first terminal of the data writing module 110 serves as the input terminal of the data writing module 110 in the aforementioned embodiment.

In one embodiment, a control terminal of the first light emission control unit 141 is connected to a first light emission control signal line EM1, a first terminal of the first light emission control unit 141 is connected to a first power line VDD, and a second terminal of the first light emission control unit 141 is connected to the first terminal of the driving module 120; a control terminal of the second light emission control unit 142 is connected to a second light emission control signal line EM2, a first terminal of the second light emission control unit 142 is connected to the second terminal of the driving module 120, and a second terminal of the second light emission control unit 142 is connected to the first terminal of the light-emitting module 150; and the second terminal of the light-emitting module 150 is connected to the second power line VSS.

With reference to FIG. 3, the compensation module 130 is connected between the second terminal of the driving module 120 and the control terminal of the driving module 120, where a control terminal of the compensation module 130 is connected to a compensation control signal line Sn, a first terminal of the compensation module 130 is connected to the second terminal of the driving module 120, and a second terminal of the compensation module 130 is connected to the control terminal of the driving module 120.

With reference to FIG. 4, the compensation module 130 is connected between the second terminal of the driving module 120 and the control terminal of the driving module 120, where a control terminal of the compensation module 130 is connected to the first light emission control signal line EM1, a first terminal of the compensation module 130 is connected to the second terminal of the driving module 120, and a second terminal of the compensation module 130 is connected to the control terminal of the driving module 120.

FIG. 3 may correspond to a structure in which the modules in FIG. 1 are detailed as circuit devices, and FIG. 4 may correspond to a structure in which the modules in FIG. 2 are detailed as circuit devices. In one embodiment, the driving module 120 includes a driving transistor DT, the data writing module 110 includes a first transistor T1, the compensation module 130 includes a second transistor T2, the first light emission control unit 141 includes a third transistor T3, the second light emission control unit 142 includes a fourth transistor T4, the initialization module 170 includes a sixth transistor T6, and the light-emitting module 150 includes a light-emitting device D1, where the light-emitting device D1 may be an organic light-emitting device D1 or an inorganic light-emitting device D1.

Continuing with reference to FIG. 3, in one embodiment, the control terminal of the reset module 160 is connected to a third scan line S3, and the reset module 160 includes a fifth transistor T5.

In one embodiment, the second transistor T2 is an N-type transistor, and other transistors are P-type transistors. In one embodiment, a transistor included in the first light emission control unit has a channel type opposite to that of a transistor included in the compensation module. In one embodiment, the second transistor T2 is an oxide transistor, which has a relatively low leakage current, thereby enabling the potential of the control terminal of the driving module 120 in the light emission stage to be better maintained, which is more beneficial for improving display uniformity, thereby improving the display quality.

Figure 5:
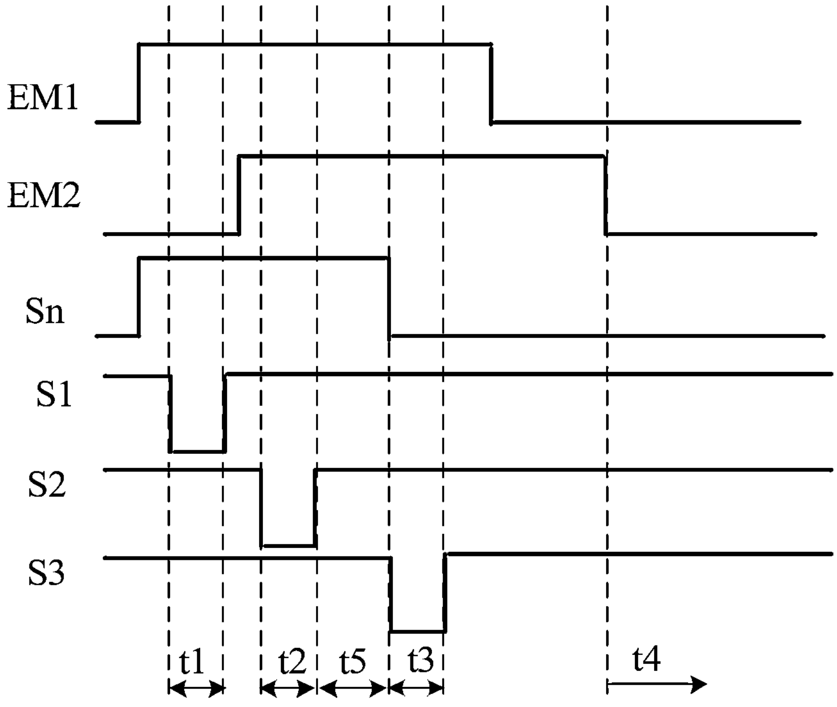
FIG. 5 is a drive timing diagram of a writing frame of a pixel circuit according to an embodiment of the present application.

FIG. 5 is a drive timing diagram of a writing frame of a pixel circuit according to an embodiment of the present application, and the drive timing can be used to drive the pixel circuit shown in FIG. 3. With reference to FIG. 3 and FIG. 5, in the writing frame, the operating process of the pixel circuit includes a first initialization stage t1, a data writing stage t2, a reset stage t3, and a light emission stage t4 that are performed sequentially.

In the first initialization stage t1, a first light emission control signal on the first light emission control signal line EM1 is at a high level, a second light emission control signal on the second light emission control signal line EM2 is at a low level, a first scan signal on the first scan line S1 is at a low level, signals on the second scan line S2 and the third scan line S3 are at a high level, and a compensation control signal on the compensation control signal line Sn is at a high level. Therefore, the sixth transistor T6 is turned on in response to the low-level first scan signal, the fourth transistor T4 is turned on in response to the low-level second light emission control signal, and the second transistor T2 is turned in response to the high-level compensation control signal, and an initialization voltage on the initialization line Vref is written to the anode of the light-emitting device D1 through the sixth transistor T6, thereby achieving the initialization of the anode of the light-emitting device D1. At the same time, the initialization voltage is also written to the gate of the driving transistor DT through the sixth transistor T6, the fourth transistor T4, and the second transistor T2, thereby achieving the initialization of the gate of the driving transistor DT.

In the data writing stage t2, a second scan signal on the second scan line S2 is at a low level, and the other control signals in the pixel circuit are at a high level, and therefore the first transistor T1 is turned on in response to the low-level second scan signal, and the second transistor T2 is turned on in response to the high-level compensation control signal, and the data voltage is written to the gate of the driving transistor DT through the first transistor T1, the driving transistor DT, and the second transistor T2, thereby achieving the compensation of the threshold voltage of the driving transistor DT at the same time.

In the reset stage t3, the third scan signal is at a low level, the compensation control signal is at a low level, and the other control signals in the pixel circuit are all at a high level, and therefore the fifth transistor T5 is turned on in response to the low-level third scan signal, and the reset voltage VEH is written to the drain of the driving transistor DT through the fifth transistor T5, and is written to the source of the driving transistor DT through the driving transistor DT.

In the light emission stage t4, the first light emission control signal and the second light emission control signal are at a low level, and therefore the third transistor T3 and the fourth transistor T4 are turned on, and the driving transistor DT drives the light-emitting device D1 to emit light.

Figure 6:
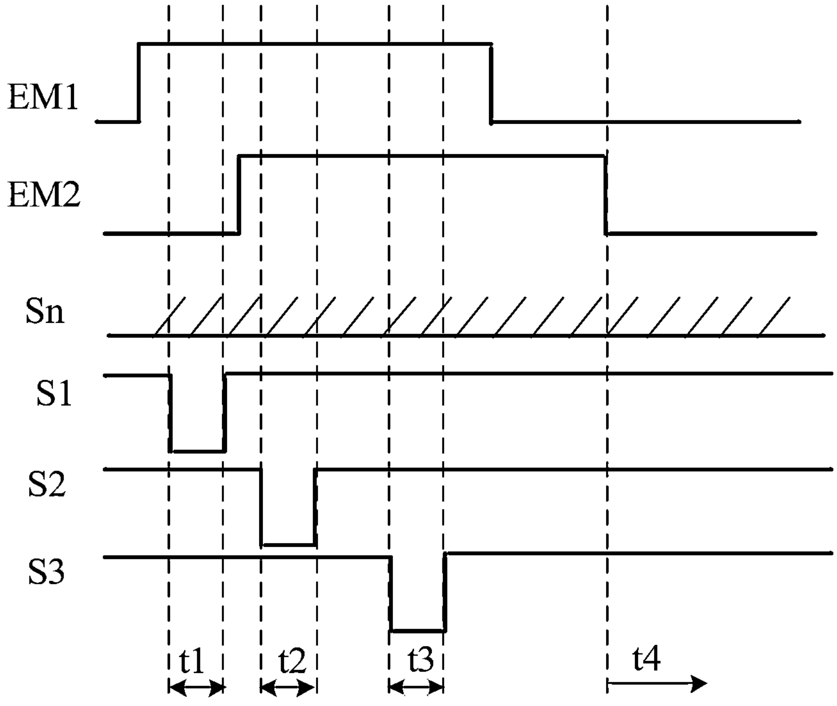
FIG. 6 is a drive timing diagram of an idle frame of a pixel circuit according to an embodiment of the present application.

FIG. 6 is a drive timing diagram of an idle frame of a pixel circuit according to an embodiment of the present application, and the drive timing can be used to drive the pixel circuit shown in FIG. 3.

With reference to FIG. 3 and FIG. 6, in the idle frame, the operating process of the pixel circuit includes a first initialization stage t1, a reset stage t3, and a light emission stage t4 that are performed sequentially.

In the first initialization stage t1, a first light emission control signal on the first light emission control signal line EM1 is at a high level, a second light emission control signal on the second light emission control signal line EM2 is at a low level, a first scan signal on the first scan line S1 is at a low level, signals on the second scan line S2 and the third scan line S3 are at a high level, and a compensation control signal on the compensation control signal line Sn is at a low level. Therefore, the sixth transistor T6 is turned on in response to the low-level first scan signal, and the fourth transistor T4 is turned on in response to the low-level second light emission control signal, and an initialization voltage on the initialization line Vref is written to the anode of the light-emitting device D1 through the sixth transistor T6, thereby achieving the initialization of the anode of the light-emitting device D1.

In another embodiment of the present application, in the idle frame, the first light emission control signal on the first light emission control line is always at a low level, and therefore the third transistor T3 is turned on in the first initialization stage t1, and since the fourth transistor T4 also is turned on in the first initialization stage t1, there is a large current between the first power line VDD and the initialization line Vref, which helps to reduce image retention.

In the reset stage t3, the third scan signal is at a low level, the compensation control signal is at a low level, and the other control signals in the pixel circuit are all at a high level, and therefore the fifth transistor T5 is turned on in response to the low-level third scan signal, and the reset voltage VEH is written to the drain of the driving transistor DT through the fifth transistor T5, and is written to the source of the driving transistor DT through the driving transistor DT.

In the light emission stage t4, the first light emission control signal and the second light emission control signal are at a low level, and therefore the third transistor T3 and the fourth transistor T4 are turned on, and the driving transistor DT drives the light-emitting device D1 to emit light.

In one embodiment, in FIG. 3, the first scan line S1, the second scan line S2, and the third scan line S3 are connected to the same scan driver circuit, which facilitates the implementation of a narrow bezel of a display panel.

Figure 7:
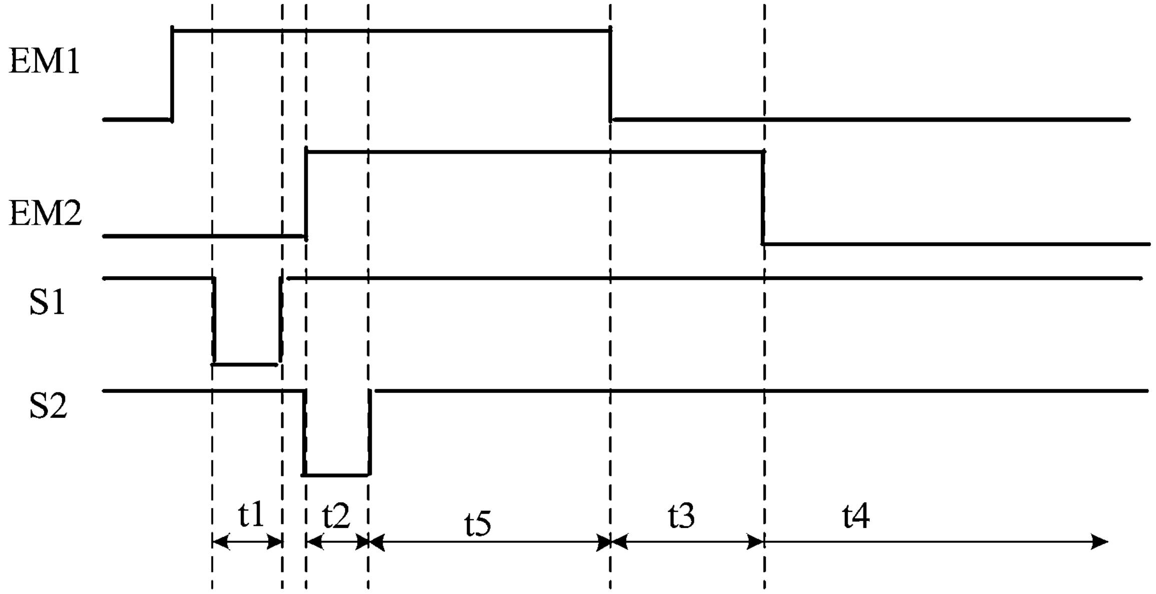
FIG. 7 is a drive timing diagram of a writing frame of another pixel circuit according to an embodiment of the present application.

With reference to FIG. 4, in one embodiment, the reset module includes a first transistor T1 and a third transistor T3. FIG. 7 is a drive timing diagram of a writing frame of another pixel circuit according to an embodiment of the present application, and the drive timing can be used to drive the pixel circuit shown in FIG. 4.

With reference to FIG. 4 and FIG. 7, in the writing frame, the operating process of the pixel circuit includes a first initialization stage t1, a data writing stage t2, a reset stage t3, and a light emission stage t4 that are performed sequentially.

In the first initialization stage t1, a first light emission control signal on the first light emission control signal line EM1 is at a high level, a second light emission control signal on the second light emission control signal line EM2 is at a low level, a first scan signal on the first scan line S1 is at a low level, and a signal on the second scan line S2 is at a high level. Therefore, the sixth transistor T6 is turned on in response to the low-level first scan signal, the fourth transistor T4 is turned on in response to the low-level second light emission control signal, and the second transistor T2 is turned on in response to the high-level first light emission control signal, and an initialization voltage on the initialization line Vref is written to the anode of the light-emitting device D1 through the sixth transistor T6, thereby achieving the initialization of the anode of the light-emitting device D1. At the same time, the initialization voltage is also written to the gate of the driving transistor DT through the sixth transistor T6, the fourth transistor T4, and the second transistor T2, thereby achieving the initialization of the gate of the driving transistor DT.

In the data writing stage t2, the second scan signal on the second scan line S2 is at a low level, and the other control signals in the pixel circuit are at a high level, and therefore the first transistor T1 is turned on in response to the low-level second scan signal, and the second transistor T2 is turned on in response to the high-level first light emission control signal, and in the writing frame, a data voltage is input to a data line Data, and the data voltage is written to the gate of the driving transistor DT through the first transistor T1, the driving transistor DT, and the second transistor T2, thereby achieving the compensation of the threshold voltage of the driving transistor DT at the same time.

In the reset stage t3, the first light emission control signal is at a low level, and therefore the third transistor T3 is turned on in response to the low-level first light emission control signal, and the first power supply voltage is written to the source of the driving transistor DT through the third transistor T3, and is written to the drain of the driving transistor DT through the driving transistor DT.

In the light emission stage t4, the first light emission control signal and the second light emission control signal are at a low level, and therefore the third transistor T3 and the fourth transistor T4 are turned on, and the driving transistor DT drives the light-emitting device D1 to emit light.

Figure 8:
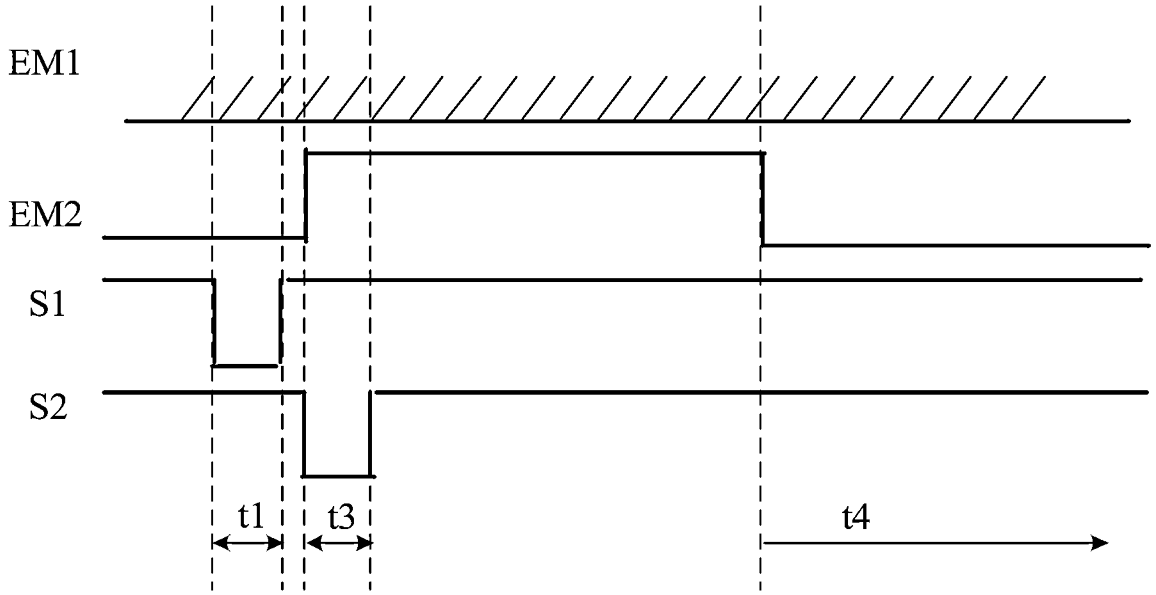
FIG. 8 is a drive timing diagram of an idle frame of another pixel circuit according to an embodiment of the present application.

FIG. 8 is a drive timing diagram of an idle frame of another pixel circuit according to an embodiment of the present application, and the drive timing can be used to drive the pixel circuit shown in FIG. 4.

With reference to FIG. 4 and FIG. 8, in the idle frame, the operating process of the pixel circuit includes a first initialization stage t1, a reset stage t3, and a light emission stage t4 that are performed sequentially.

In the first initialization stage t1, a first light emission control signal on the first light emission control signal line EM1 is at a low level, a second light emission control signal on the second light emission control signal line EM2 is at a low level, a first scan signal on the first scan line S1 is at a low level, and a signal on the second scan line S2 is at a high level. Therefore, the sixth transistor T6 is turned on in response to the low-level first scan signal, the fourth transistor T4 is turned on in response to the low-level second light emission control signal, and the third transistor T3 is turned on in response to the low-level first light emission control signal, and an initialization voltage on the initialization line Vref is written to the anode of the light-emitting device D1 through the sixth transistor T6, thereby achieving the initialization of the anode of the light-emitting device D1. At the same time, there is a large current between the first power line VDD and the initialization line Vref, which helps to reduce image retention, thereby improving the display quality.

In the reset stage t3, the first light emission control signal is at a low level, and therefore the third transistor T3 is turned on in response to the low-level first light emission control signal, and the first power supply voltage is written to the source of the driving transistor DT through the third transistor T3. At the same time, the second scan signal is at a low level, and the voltage input by the data line Data is also the first power supply voltage. Therefore, the first power supply voltage is also written to the source of the driving transistor DT through the first transistor T1, and the first power supply voltage is written to the drain of the driving transistor DT through the driving transistor DT. That is, the first light emission control unit 141 (the third transistor T3) is further configured to write the first power supply voltage to the first terminal and the second terminal of the driving module 120 in the reset stage of the writing frame.

In the light emission stage t4, the first light emission control signal and the second light emission control signal are at a low level, and therefore the third transistor T3 and the fourth transistor T4 are turned on, and the driving transistor DT drives the light-emitting device D1 to emit light.

In one embodiment, in FIG. 4, the first scan line S1 and the second scan line S2 are connected to the same scan driver circuit, which facilitates the implementation of a narrow bezel of a display panel.

Figure 9:
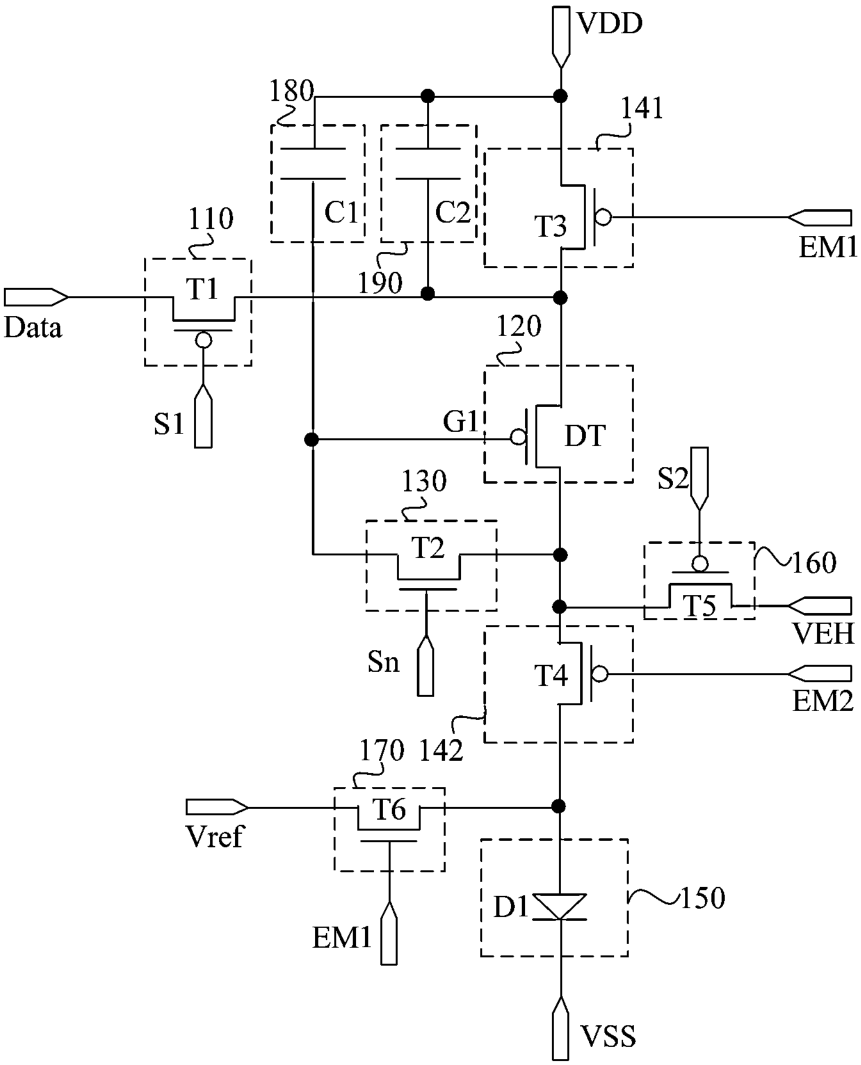
FIG. 9 is a schematic diagram of a structure of another pixel circuit according to an embodiment of the present application.

FIG. 9 is a schematic diagram of a structure of another pixel circuit according to an embodiment of the present application, and FIG. 9 may correspond to another structure in which the modules in FIG. 1 are detailed as circuit devices. With reference to FIG. 9, FIG. 9 differs from FIG. 3 in that the control terminal of the initialization module 170 is connected to the first light emission control line EM1, the control terminal of the data writing module 110 is connected to the first scan line S1, and the control terminal of the reset module 160 is connected to the second scan line S2. With reference to FIG. 9, in one embodiment, the control terminal of the first light emission control unit 141 is connected to the first light emission control line EM1, and the control terminal of the second light emission control unit 142 is connected to the second light emission control line EM2; the compensation module 130 is connected between the second terminal of the driving module 120 and the control terminal of the driving module 120, and the control terminal of the compensation module 130 is connected to the compensation control signal line Sn; and the control terminal of the initialization module 170 is connected to the first light emission control line EM1.

In one embodiment, a transistor included in the initialization module 170 has a channel type opposite to that of a transistor included in the first light emission control unit 141. In one embodiment, the transistor included in the initialization module 170 is an oxide transistor. With reference to FIG. 9, the second transistor T2 and the sixth transistor T6 are N-type transistors, and the other transistors are all P-type transistors.

Figure 10:
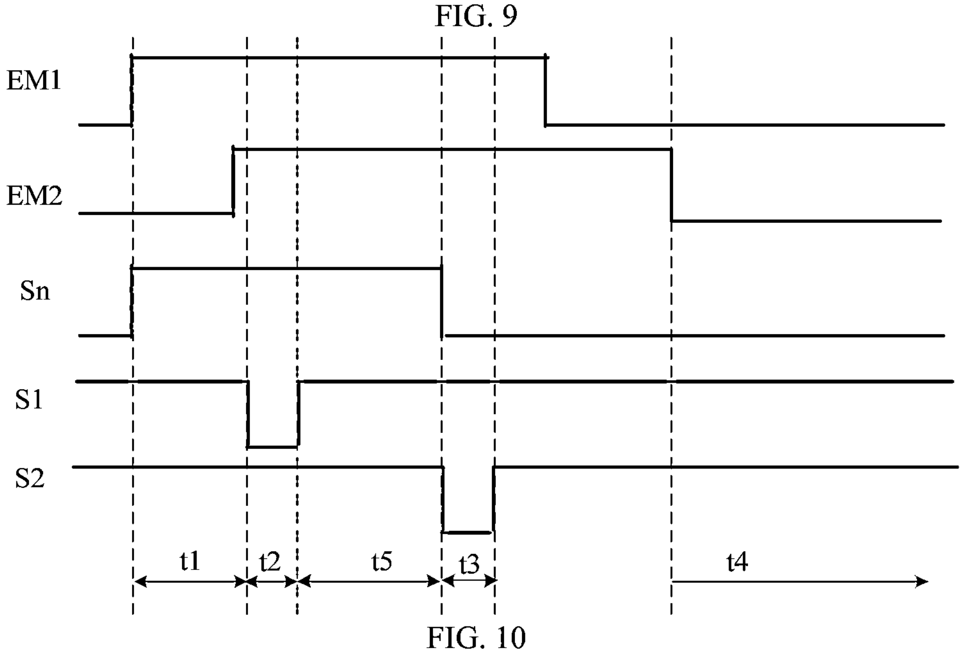
FIG. 10 is a drive timing of a writing frame of another pixel circuit according to an embodiment of the present application.

FIG. 10 is a drive timing diagram of a writing frame of another pixel circuit according to an embodiment of the present application, and the drive timing can be used to drive the pixel circuit shown in FIG. 9. With reference to FIG. 9 and FIG. 10, in the writing frame, the operating process of the pixel circuit includes a first initialization stage t1, a data writing stage t2, a reset stage t3, and a light emission stage t4 that are performed sequentially.

In the first initialization stage t1, a first light emission control signal on the first light emission control signal line EM1 is at a high level, a second light emission control signal on the second light emission control signal line EM2 is at a low level, a first scan signal on the first scan line S1 is at a high level, a second scan signal on the second scan line S2 is at a high level, and a compensation control signal on the compensation control signal line Sn is at a high level. Therefore, the sixth transistor T6 is turned on in response to the high-level first light emission control signal, the fourth transistor T4 is turned on in response to the low-level second light emission control signal, and the second transistor T2 is turned on in response to the high-level compensation control signal, and an initialization voltage on the initialization line Vref is written to the anode of the light-emitting device D1 through the sixth transistor T6, thereby achieving the initialization of the anode of the light-emitting device D1. At the same time, the initialization voltage is also written to the gate of the driving transistor DT through the sixth transistor T6, the fourth transistor T4, and the second transistor T2, thereby achieving the initialization of the gate of the driving transistor DT.

In the data writing stage t2, a second scan signal on the first scan line S1 is at a low level, and the other control signals in the pixel circuit are at a high level, and therefore the first transistor T1 is turned on in response to the low-level first scan signal, and the second transistor T2 is turned on in response to the high-level compensation control signal, and the data voltage is written to the gate of the driving transistor DT through the first transistor T1, the driving transistor DT, and the second transistor T2, thereby achieving the compensation of the threshold voltage of the driving transistor DT at the same time.

In the reset stage t3, the second scan signal is at a low level, the compensation control signal is at a low level, and the other control signals in the pixel circuit are all at a high level, and therefore the fifth transistor T5 is turned on in response to the low-level second scan signal, and the reset voltage VEH is written to the drain of the driving transistor DT through the fifth transistor T5, and is written to the source of the driving transistor DT through the driving transistor DT.

In the light emission stage t4, the first light emission control signal and the second light emission control signal are at a low level, and therefore the third transistor T3 and the fourth transistor T4 are turned on, and the driving transistor DT drives the light-emitting device D1 to emit light.

The drive timing of the pixel circuit shown in FIG. 9 in the idle frame differs from the drive timing of the writing frame shown in FIG. 10 only in that, in the idle frame, the compensation control signal is always at a low level, while the other control signals are the same as those in the writing frame. The operating process of the pixel circuit shown in FIG. 9 in the idle frame includes a first initialization stage, a reset stage, and a light emission stage that are performed sequentially.

In the first initialization stage, the first light emission control signal is at a high level, and an initialization voltage on the initialization line is written to the anode of the light-emitting device through the sixth transistor, thereby achieving the initialization of the anode of the light-emitting device. In another embodiment of the present application, in the idle frame, the first light emission control signal on the first light emission control line is always at a low level. Therefore, in the first initialization stage, the third transistor is turned on, and there is a large current between the first power line and the initialization line, which helps to reduce image retention.

The operating processes of the reset stage and the light emission stage of the idle frame are respectively the same as those of the reset stage and the light emission stage of the writing frame, which will not be repeated here.

In one embodiment, in FIG. 9, the first scan line S1 and the second scan line S2 are connected to the same scan driver circuit, which facilitates the implementation of a narrow bezel of a display panel.

Figure 11:
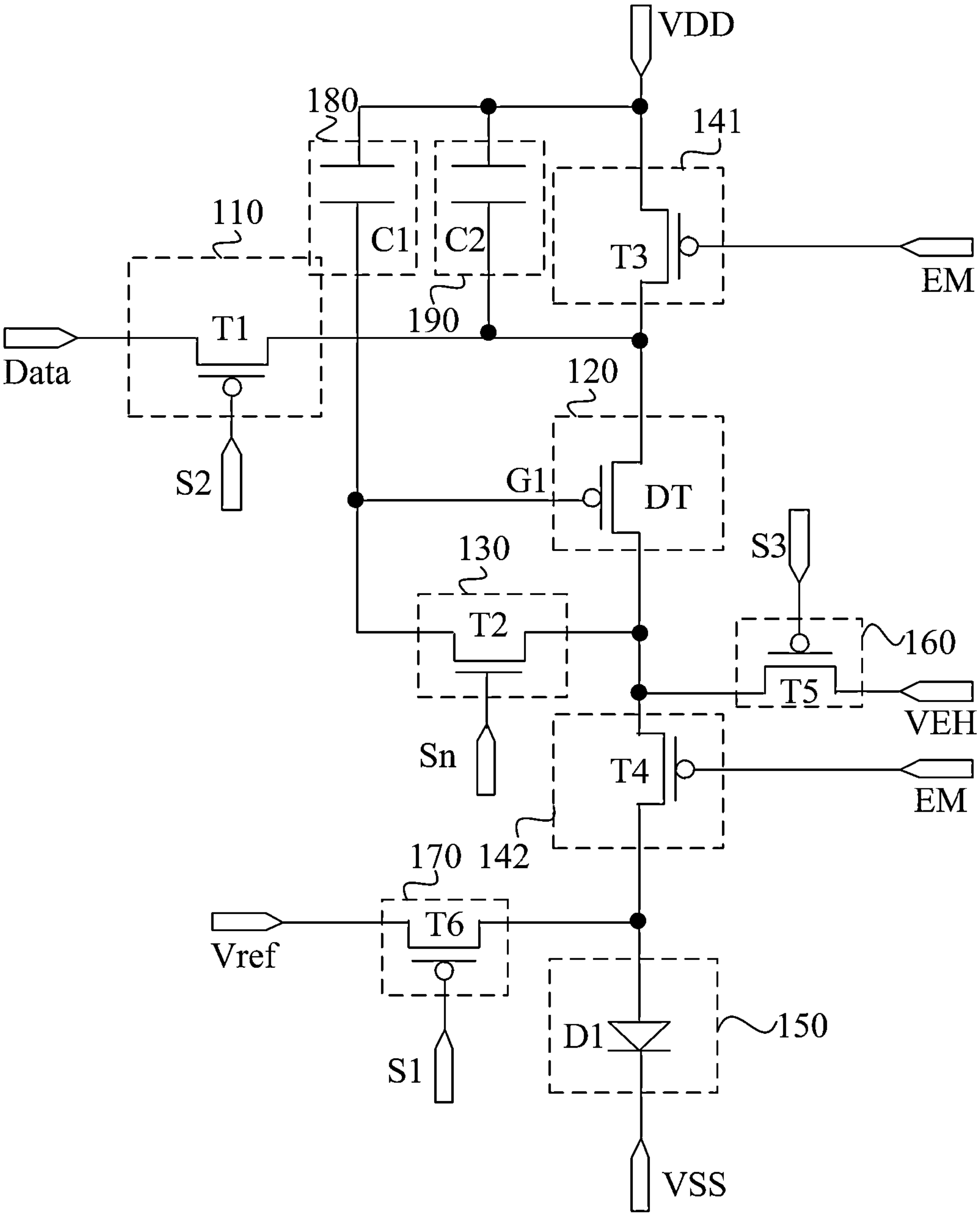
FIG. 11 is a schematic diagram of a structure of another pixel circuit according to an embodiment of the present application.

FIG. 11 is a schematic diagram of a structure of another pixel circuit according to an embodiment of the present application, and FIG. 11 may correspond to another structure in which the modules in FIG. 3 are detailed as circuit devices. With reference to FIG. 11, like the pixel circuit shown in FIG. 3, the control terminal of the compensation module 130 is connected to the compensation control signal line Sn. The pixel circuits shown in FIG. 11 differs from FIG. 3 in that the control terminal of the first light emission control unit 141 and the control terminal of the second light emission control unit 142 are electrically connected to the same light emission control line EM.

Figure 12:
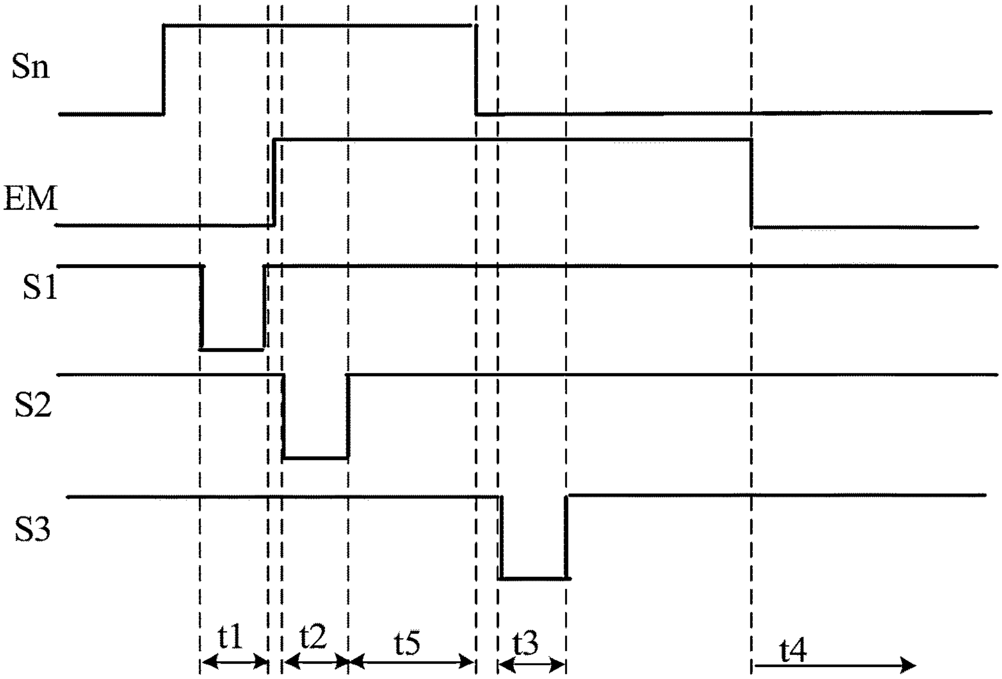
FIG. 12 is a drive timing diagram of a writing frame of another pixel circuit according to an embodiment of the present application.

FIG. 12 is a drive timing diagram of a writing frame of another pixel circuit according to an embodiment of the present application, and the drive timing can be used to drive the pixel circuit shown in FIG. 11. With reference to FIG. 11 and FIG. 12, in the writing frame, the operating process of the pixel circuit includes a first initialization stage t1, a data writing stage t2, a reset stage t3, and a light emission stage t4 that are performed sequentially.

In the first initialization stage t1, a light emission control signal on a light emission control signal line EM is at a low level, a first scan signal on the first scan line S1 is at a low level, signals on the second scan line S2 and the third scan line S3 are at a high level, and a compensation control signal on the compensation control signal line Sn is at a high level. Therefore, the sixth transistor T6 is turned on in response to the low-level first scan signal, the fourth transistor T4 is turned on in response to the low-level light emission control signal, and the second transistor T2 is turned on in response to the high-level compensation control signal, and an initialization voltage on the initialization line Vref is written to the anode of the light-emitting device D1 through the sixth transistor T6, thereby achieving the initialization of the anode of the light-emitting device D1. At the same time, the initialization voltage is also written to the gate of the driving transistor DT through the sixth transistor T6, the fourth transistor T4, and the second transistor T2, thereby achieving the initialization of the gate of the driving transistor DT. At the same time, the third transistor T3 is turned on in response to the low-level light emission control signal, and there is a large current between the first power line VDD and the initialization line Vref, which helps to reduce image retention.

In the data writing stage t2, the second scan signal on the second scan line S2 is at a low level, and the other control signals in the pixel circuit are at a high level, and therefore the first transistor T1 is turned on in response to the low-level second scan signal, and the second transistor T2 is turned on in response to the high-level compensation control signal, and the data voltage is written to the gate of the driving transistor DT through the first transistor T1, the driving transistor DT, and the second transistor T2, thereby achieving the compensation of the threshold voltage of the driving transistor DT at the same time.

In the reset stage t3, the third scan signal is at a low level, the compensation control signal is at a low level, and the other control signals in the pixel circuit are all at a high level, and therefore the fifth transistor T5 is turned on in response to the low-level third scan signal, and the reset voltage VEH is written to the drain of the driving transistor DT through the fifth transistor T5, and is written to the source of the driving transistor DT through the driving transistor DT.

In the light emission stage t4, the light emission control signal is at a low level, the third transistor T3 and the fourth transistor T4 are turned on, and the driving transistor DT drives the light-emitting device D1 to emit light.

The drive timing of the pixel circuit shown in FIG. 11 in the idle frame differs from the drive timing of the writing frame shown in FIG. 12 only in that, in the idle frame, the compensation control signal is always at a low level, while the other control signals are the same as those in the writing frame. The operating process of the pixel circuit shown in FIG. 11 in the idle frame includes a first initialization stage, a reset stage, and a light emission stage that are performed sequentially.

In the first initialization stage, the first scan signal is at a low level, and an initialization voltage on the initialization line is written to the anode of the light-emitting device through the sixth transistor, thereby achieving the initialization of the anode of the light-emitting device. The operating processes of the reset stage and the light emission stage of the idle frame are respectively the same as those of the reset stage and the light emission stage of the writing frame, which will not be repeated here.

Through the aforementioned analysis of the operating processes of the pixel circuits shown in FIG. 3, FIG. 4, FIG. 9, and FIG. 11 in the writing frame and the idle frame, it can be seen that, by configuring the pixel circuit to include the reset module 160, before the light emission stages of the writing frame and the idle frame, the source voltage of the driving transistor DT is the same, and the drain voltage of the driving transistor DT is also the same. Therefore, the bias state of the driving transistor DT is the same in the writing frame and the idle frame, which ensures that the luminance of the light-emitting device D1 is consistent in the writing frame and the idle frames, thereby improving the display quality.

It has also been found through research that when the pixel circuit operates at a high refresh rate, the initialization time for the control terminal of the driving module is relatively short. Consequently, during initialization of different pixel circuits with large grayscale differences in the previous frame, the control terminals of the driving modules are initialized to different voltages. Therefore, when displaying the current frame, there are differences in data writing to the pixel circuits, resulting in display non-uniformity of the display apparatus while causing the image retention phenomenon.

Based on the above reason, on the basis of the aforementioned embodiments, the writing frame is configured to further include a second initialization stage t11, the initialization module 170 is further configured to write an initialization voltage to the first terminal of the light-emitting module 150 and the control terminal of the driving module 120 in the second initialization stage t11 of the writing frame, and the second light emission control unit 142 and the compensation module 130 are further configured to be turned on in the second initialization stage t11 of the writing frame, to write the initialization voltage written to the first terminal of the light-emitting module 150 to the control terminal of the driving module through the second light emission control unit 142 and the compensation module 130, where the second initialization stage t11 precedes the first initialization stage t1.

The writing frame is configured to further include the second initialization stage t11, and in the second initialization stage t11, the initialization voltage is written to the first terminal of the light-emitting module 150, and the initialization voltage is written to the control terminal of the driving module 120 through the initialization module 170, the second light emission control unit 142, and the compensation module 130, where the writing of the initialization voltage to the control terminal of the driving module 120 includes two stages: the second initialization stage t11 and the first initialization stage t1. Therefore, the time for writing the initialization voltage to the control terminal of the driving module 120 is extended, which facilitates sufficient writing of the initialization voltage to the control terminal of the driving module 120 before the data writing stage t2 of the writing frame. This reduces the difference in data writing in the data writing stage t2, thereby improving the display uniformity of the display apparatus and alleviating image retention.

On the basis of the aforementioned embodiment, the writing frame further includes a pre-charging stage t21, and the data writing module 110 is further configured to write a pre-charging voltage to the control terminal of the driving module 120 in the pre-charging stage t21 of the writing frame, where in the writing frame, the pre-charging stage t21 is between the second initialization stage t11 and the first initialization stage t1, and the data writing stage t2 follows the first initialization stage t1.

In the pre-charging stage t21 between the second initialization stage t11 and the first initialization stage t1, the pre-charging voltage is written to the control terminal of the driving module 120. Since in the display panel, one data line Data is connected to one column of pixel circuits, and the data voltage difference between two close rows in the column of pixel circuits is relatively small during display, the pre-charging voltage is set to the data voltage corresponding to the upper n rows of pixel circuits in the same column as the pixel circuit. However, to ensure the normal operation of the pixel circuits, n≥2 (where the second initialization stage of the current row of pixel circuit corresponds to the data writing stage of the upper one row of pixel circuit, and thus the pre-charging voltage cannot be the data voltage corresponding to the upper 1 row of pixel circuit in the same column as the pixel circuit), which allows the difference in the pre-charging voltages written to the control terminals of the driving modules 120 of the rows of pixel circuits in the same column of pixel circuits to be relatively small in the pre-charging stage t21. As a result, in the first initialization stage t1, the control terminals of the driving modules 120 of the same column of pixel circuits all have similar voltages to start initialization, and are written with the initialization voltage. Consequently, after the first initialization stage t1, the difference in the voltages at the control terminals of the driving modules 120 is relatively small, which in turn results in a relatively small difference in data writing in the data writing stage t2, thereby improving the display uniformity. In particular, for a current frame that is a full-screen display image with the same grayscale, the data voltages corresponding to the same column of pixel circuits are the same. Therefore, regardless of the display image of the previous frame, after the pre-charging stage t21, the control terminals of the driving modules 120 are all at the same voltage. As a result, in the first initialization stage t1, the control terminals of the driving modules 120 of all the pixel circuits in a column of pixel circuits are all initialized from the same voltage to the initialization voltage, thereby further reducing the difference in data written in the data writing stage t2 and improving the display uniformity.

On the basis of the aforementioned embodiments, the initialization module 170 is further configured to be turned on in the second initialization stage t11 of the idle frame, where in the idle frame, the second initialization stage t11 precedes the first initialization stage t1.

By configuring the initialization module 170 to be turned on in the second initialization stage t11 of the idle frame, the light-emitting device D1 is not lit during black insertion in the idle frame, thereby ensuring the display quality.

Figure 13:
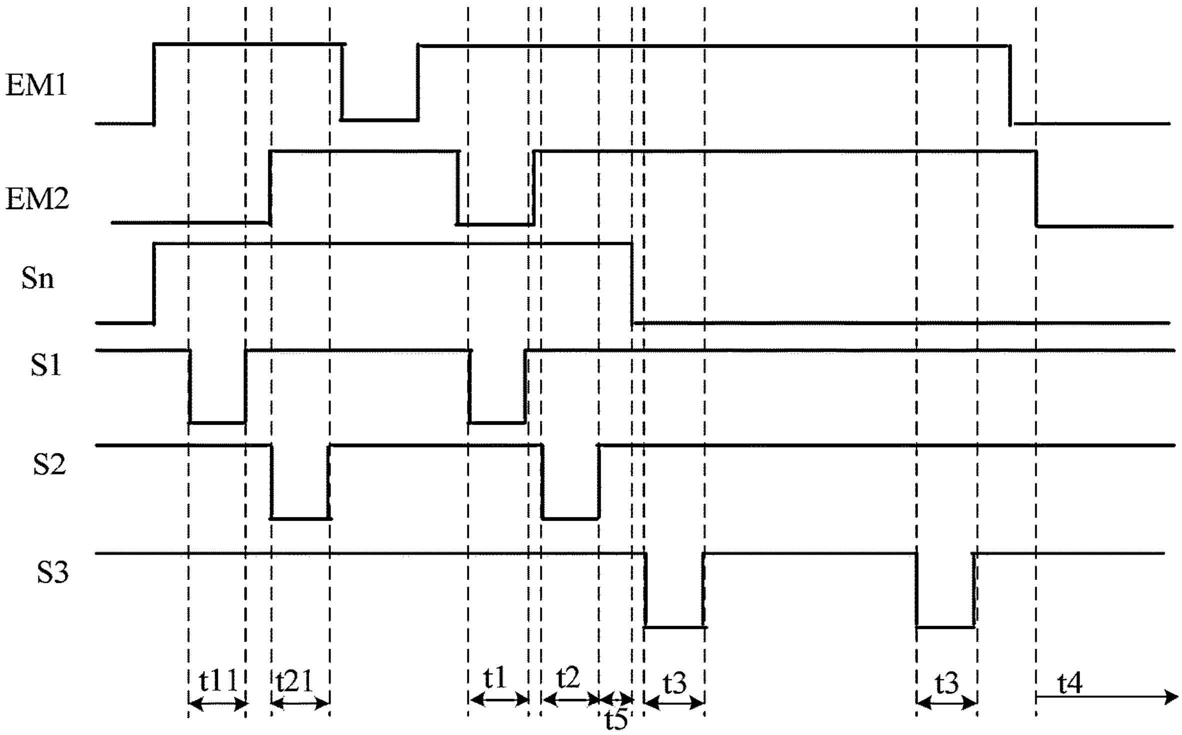
FIG. 13 is a drive timing diagram of a writing frame of another pixel circuit according to an embodiment of the present application.

FIG. 13 is a drive timing diagram of a writing frame of another pixel circuit according to an embodiment of the present application, and the drive timing can also be used to drive the pixel circuit shown in FIG. 3. With reference to FIG. 3 and FIG. 13, in the writing frame, the operating process of the pixel circuit includes a second initialization stage t11, a pre-charging stage t21, a first initialization stage t1, a data writing stage t2, and a light emission stage t4 that are performed sequentially.

In the second initialization stage t11, a first light emission control signal on the first light emission control signal line EM1 is at a high level, a second light emission control signal on the second light emission control signal line EM2 is at a low level, a first scan signal on the first scan line S1 is at a low level, signals on the second scan line S2 and the third scan line S3 are at a high level, and a compensation control signal on the compensation control signal line Sn is at a high level. Therefore, the sixth transistor T6 is turned on in response to the low-level first scan signal, the fourth transistor T4 is turned on in response to the low-level second light emission control signal, and the second transistor T2 is turned in response to the high-level compensation control signal, and an initialization voltage on the initialization line Vref is written to the anode of the light-emitting device D1 through the sixth transistor T6, thereby achieving the initialization of the anode of the light-emitting device D1. At the same time, the initialization voltage is also written to the gate of the driving transistor DT through the sixth transistor T6, the fourth transistor T4, and the second transistor T2, thereby achieving the initialization of the gate of the driving transistor DT.

In the pre-charging stage t21, a second scan signal on the second scan line S2 is at a low level, and the other control signals in the pixel circuit are at a high level, and therefore the first transistor T1 is turned on in response to the low-level second scan signal, and the second transistor T2 is turned on in response to the high-level compensation control signal, and the pre-charging voltage is written to the gate of the driving transistor DT through the first transistor T1, the driving transistor DT, and the second transistor T2. As described above, the pre-charging voltage is the data voltage corresponding to the upper n rows of pixel circuits in the same column as the pixel circuit, where n≥2, and in the subsequent data writing stage t2, the difference in data writing is also small, thereby improving the display uniformity and alleviating image retention.

In the first initialization stage t1, the operating states of the transistors in the pixel circuit are the same as those of the transistors corresponding to the first initialization stage t1 of the drive timing shown in FIG. 5. The difference lies in that, when the drive timing shown in FIG. 5 is used for driving, the gates of the driving transistors DT need to be written from the voltage of the previous frame to the initialization voltage in the first initialization stage t1, while when the drive timing shown in FIG. 13 is used for driving, the gates of the driving transistors DT are written from the pre-charging voltage to the initialization voltage, and in the first initialization stage t1, the gates of the driving transistors DT can be initialized to a similar or identical voltage. As a result, the difference in data writing in the subsequent data writing stage t2 is also relatively small, thereby improving the display uniformity.

In the data writing stage t2, the reset stage t3, and the light emission stage t4, the operating states of the transistors in the pixel circuit are respectively the same as those of the transistors in the data writing stage t2, the reset stage t3, and the light emission stage t4 corresponding to the drive timing shown in FIG. 5, which will not be repeated here.

Figure 14:
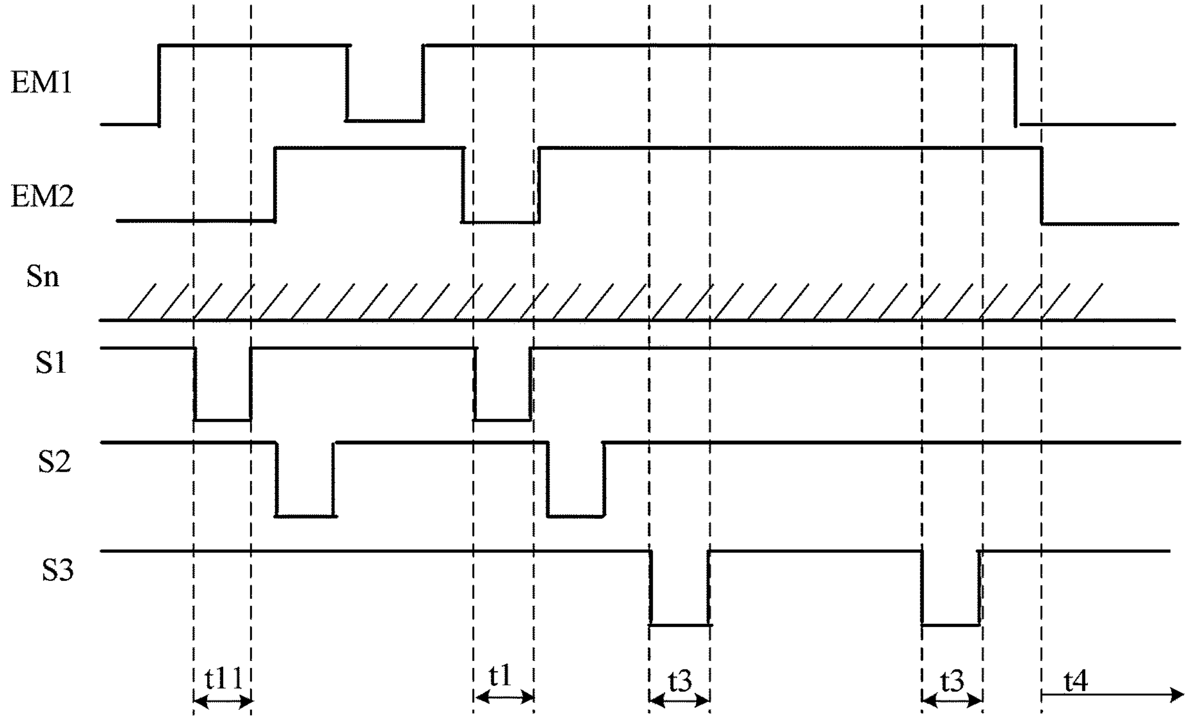
FIG. 14 is a drive timing diagram of an idle frame of a pixel circuit according to an embodiment of the present application.

FIG. 14 is a drive timing diagram of an idle frame of a pixel circuit according to an embodiment of the present application, and the drive timing can be used to drive the pixel circuit shown in FIG. 3.

With reference to FIG. 3 and FIG. 14, in the idle frame, the operating process of the pixel circuit includes a second initialization stage t11, a first initialization stage t1, a reset stage t3, and a light emission stage t4 that are performed sequentially.

In the second initialization stage t11, a first light emission control signal on the first light emission control signal line EM1 is at a high level, a second light emission control signal on the second light emission control signal line EM2 is at a low level, a first scan signal on the first scan line S1 is at a low level, signals on the second scan line S2 and the third scan line S3 are at a high level, and a compensation control signal on the compensation control signal line Sn is at a low level. Therefore, the sixth transistor T6 is turned on in response to the low-level first scan signal, and the fourth transistor T4 is turned on in response to the low-level second light emission control signal, and an initialization voltage on the initialization line Vref is written to the anode of the light-emitting device D1 through the sixth transistor T6, thereby achieving the initialization of the anode of the light-emitting device D1.

The operating process of the first initialization stage t1 is the same as that of the second initialization stage t11, which will not be repeated here.

With reference to FIG. 13 and FIG. 14, since the waveforms of the first light emission control signal and the second light emission control signal are the same, when the pixel circuit shown in FIG. 3 is driven based on FIG. 13 and FIG. 14, the first light emission control signal line EM1 and the second light emission control signal line EM2 can be connected to the same light emission driver circuit, which facilitates the implementation of a narrow bezel.

In another embodiment of the present application, in the idle frame, the first light emission control signal on the first light emission control line is always at a low level. Therefore, in the second initialization stage t11 and the first initialization stage t1, the third transistor T3 is turned on, and there is a large current between the first power line VDD and the initialization line Vref, which helps to reduce image retention.

In the reset stage t3, the third scan signal is at a low level, the compensation control signal is at a low level, and the other control signals in the pixel circuit are all at a high level, and therefore the fifth transistor T5 is turned on in response to the low-level third scan signal, and the reset voltage VEH is written to the drain of the driving transistor DT through the fifth transistor T5, and is written to the source of the driving transistor DT through the driving transistor DT.

In the light emission stage t4, the first light emission control signal and the second light emission control signal are at a low level, and therefore the third transistor T3 and the fourth transistor T4 are turned on, and the driving transistor DT drives the light-emitting device D1 to emit light.

In another embodiment of the present application, in the idle frame, the second scan line S2 may not include a low-level pulse signal, that is, the signals on the second scan line S2 of the idle frame are all at a high level.

Figure 15:
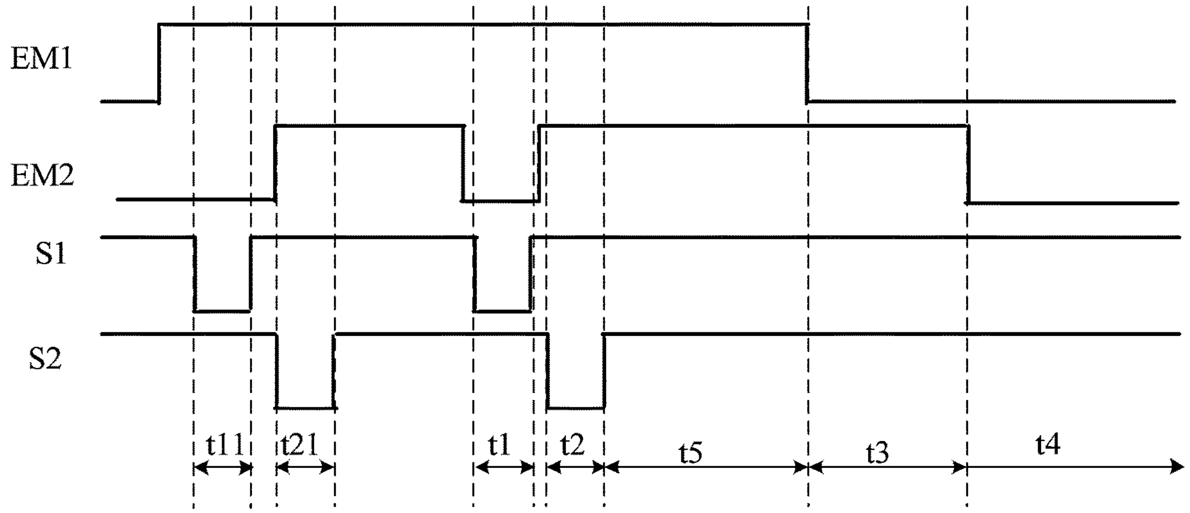
FIG. 15 is a drive timing diagram of a writing frame of another pixel circuit according to an embodiment of the present application.

FIG. 15 is a drive timing diagram of a writing frame of another pixel circuit according to an embodiment of the present application, and the drive timing can also be used to drive the pixel circuit shown in FIG. 4. With reference to FIG. 4 and FIG. 15, in the writing frame, the operating process of the pixel circuit includes a second initialization stage t11, a pre-charging stage t21, a first initialization stage t1, a data writing stage t2, a reset stage t3, and a light emission stage t4 that are performed sequentially.

In the second initialization stage t11, a first light emission control signal on the first light emission control signal line EM1 is at a high level, a second light emission control signal on the second light emission control signal line EM2 is at a low level, a first scan signal on the first scan line S1 is at a low level, and a second scan signal on the second scan line S2 is at a high level. Therefore, the sixth transistor T6 is turned on in response to the low-level first scan signal, the fourth transistor T4 is turned on in response to the low-level second light emission control signal, and the second transistor T2 is turned on in response to the high-level first light emission control signal, and an initialization voltage on the initialization line Vref is written to the anode of the light-emitting device D1 through the sixth transistor T6, thereby achieving the initialization of the anode of the light-emitting device D1. At the same time, the initialization voltage is also written to the gate of the driving transistor DT through the sixth transistor T6, the fourth transistor T4, and the second transistor T2, thereby achieving the initialization of the gate of the driving transistor DT.

In the pre-charging stage t21, the second scan signal on the second scan line S2 is at a low level, and the other control signals in the pixel circuit are at a high level, and therefore the first transistor T1 is turned on in response to the low-level second scan signal, and the second transistor T2 is turned on in response to the high-level first light emission control signal, and the pre-charging voltage is written to the gate of the driving transistor DT through the first transistor T1, the driving transistor DT, and the second transistor T2.

In the first initialization stage t1, the data writing stage t2, the reset stage t3, and the light emission stage t4, the operating states of the transistors in the pixel circuit are respectively the same as those of the transistors in the first initialization stage t1, the data writing stage t2, the reset stage t3, and the light emission stage t4 corresponding to the drive timing shown in FIG. 7, which will not be repeated here.

In this embodiment, the pre-charging voltage is the data voltage corresponding to the upper n rows of pixel circuits in the same column as the pixel circuit, where $n \geq 2$, and the gates of the driving transistors DT are written from the pre-charging voltage to the initialization voltage in the first initialization stage t1. As a result, the gates of the driving transistors DT can be initialized to a similar or identical voltage in the first initialization stage t1, and in the subsequent data writing stage t2, the difference in data writing is also small, thereby improving the display uniformity and alleviating image retention.

Figure 16:
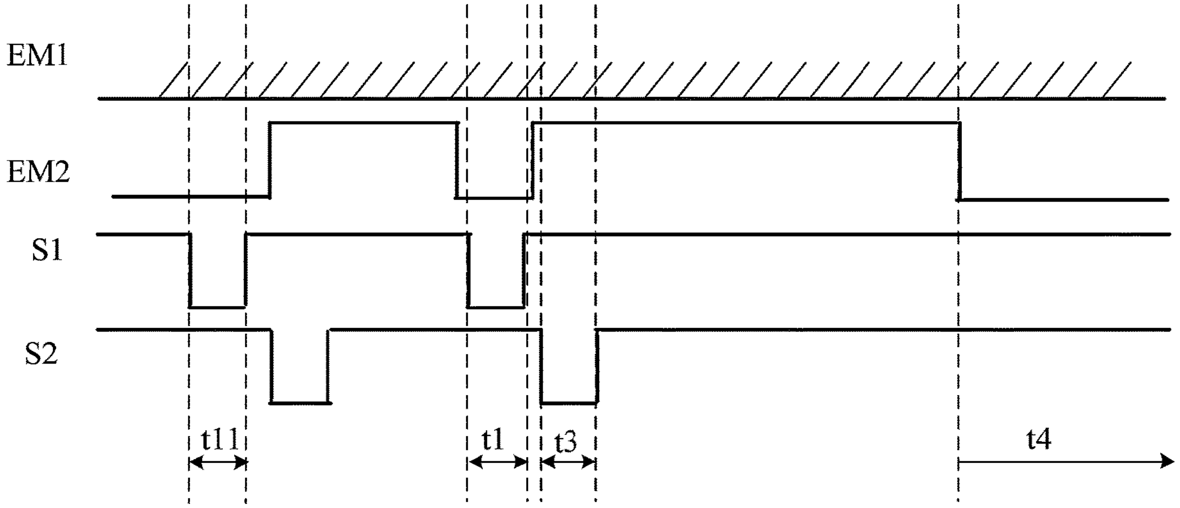
FIG. 16 is a drive timing diagram of an idle frame of another pixel circuit according to an embodiment of the present application.

FIG. 16 is a drive timing diagram of an idle frame of another pixel circuit according to an embodiment of the present application, and the drive timing can be used to drive the pixel circuit shown in FIG. 4.

With reference to FIG. 4 and FIG. 16, in the idle frame, the operating process of the pixel circuit includes a second initialization stage t11, a first initialization stage t1, a reset stage t3, and a light emission stage t4 that are performed sequentially.

In the second initialization stage t11, a first light emission control signal on the first light emission control signal line EM1 is at a low level, a second light emission control signal on the second light emission control signal line EM2 is at a low level, a first scan signal on the first scan line S1 is at a low level, and a second scan signal on the second scan line S2 is at a high level. Therefore, the sixth transistor T6 is turned on in response to the low-level first scan signal, and the fourth transistor T4 is turned on in response to the low-level second light emission control signal, and an initialization voltage on the initialization line Vref is written to the anode of the light-emitting device D1 through the sixth transistor T6, thereby achieving the initialization of the anode of the light-emitting device D1. At the same time, the third transistor T3 is turned on in response to the low-level first light emission control signal, and there is a large current between the first power line VDD and the initialization line Vref, which helps to reduce image retention.

The operating process of the first initialization stage t1 is the same as that of the second initialization stage t11, which will not be repeated here.

In the reset stage t3 and the light emission stage t4, the states of the transistors in the pixel circuit are respectively the same as the operating processes in the reset stage t3 and the light emission stage t4 in the drive timing in FIG. 8, which will not be repeated here.

Figure 17:
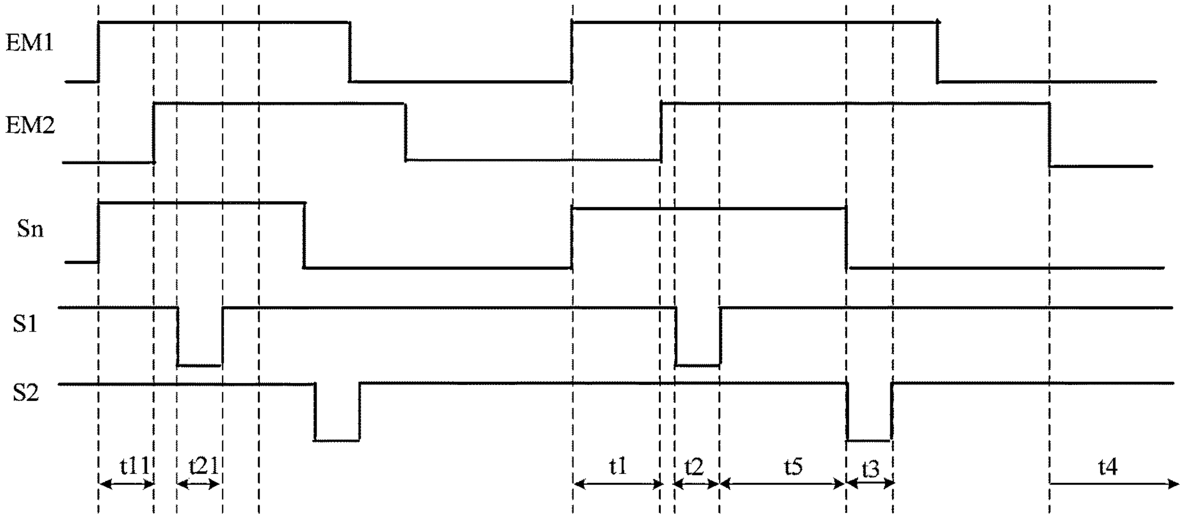
FIG. 17 is a drive timing diagram of a writing frame of another pixel circuit according to an embodiment of the present application.

FIG. 17 is a drive timing diagram of a writing frame of another pixel circuit according to an embodiment of the present application, and the drive timing can also be used to drive the pixel circuit shown in FIG. 9. With reference to FIG. 9 and FIG. 17, in the writing frame, the operating process of the pixel circuit includes a second initialization stage t11, a pre-charging stage t21, a first initialization stage t1, a data writing stage t2, a reset stage t3, and a light emission stage t4 that are performed sequentially.

In the second initialization stage t11, a first light emission control signal on the first light emission control signal line EM1 is at a high level, a second light emission control signal on the second light emission control signal line EM2 is at a low level, a first scan signal on the first scan line S1 is at a high level, a second scan signal on the second scan line S2 is at a high level, and a compensation control signal on the compensation control signal line Sn is at a high level. Therefore, the sixth transistor T6 is turned on in response to the high-level first light emission control signal, the fourth transistor T4 is turned on in response to the low-level second light emission control signal, and the second transistor T2 is turned on in response to the high-level compensation control signal, and an initialization voltage on the initialization line Vref is written to the anode of the light-emitting device D1 through the sixth transistor T6, thereby achieving the initialization of the anode of the light-emitting device D1. At the same time, the initialization voltage is also written to the gate of the driving transistor DT through the sixth transistor T6, the fourth transistor T4, and the second transistor T2, thereby achieving the initialization of the gate of the driving transistor DT.

In the pre-charging stage t21, the first scan signal on the first scan line S1 is at a low level, and the other control signals in the pixel circuit are at a high level. And therefore the first transistor T1 is turned on in response to the low-level first scan signal, and the second transistor T2 is turned on in response to the high-level compensation control signal, and the pre-charging voltage is written to the gate of the driving transistor DT through the first transistor T1, the driving transistor DT, and the second transistor T2.

In the first initialization stage t1, the data writing stage t2, the reset stage t3, and the light emission stage t4, the operating states of the transistors in the pixel circuit are respectively the same as those of the transistors in the first initialization stage t1, the data writing stage t2, the reset stage t3, and the light emission stage t4 corresponding to the drive timing shown in FIG. 10, which will not be repeated here.

Based on the same reasons as those for the drive timings in FIG. 13 and FIG. 15, the pixel circuit according to this embodiment can improve the display uniformity and alleviate image retention, which will not be repeated here.

The drive timing of the pixel circuit shown in FIG. 9 in the idle frame differs from the drive timing of the writing frame shown in FIG. 17 only in that, in the idle frame, the compensation control signal is always at a low level, while the other control signals are the same as those in the writing frame. The operating process of the pixel circuit shown in FIG. 9 in the idle frame includes a second initialization stage, a first initialization stage, a reset stage, and a light emission stage that are performed sequentially.

In the second initialization stage, a first light emission control signal on the first light emission control signal line is at a high level, a second light emission control signal on the second light emission control signal line is at a low level, a first scan signal on the first scan line is at a high level, a second scan signal on the second scan line is at a high level, and a compensation control signal on the compensation control signal line Sn is at a low level. Therefore, the sixth transistor is turned on in response to the high-level first light emission control signal, and the fourth transistor is turned on in response to the low-level second light emission control signal, and an initialization voltage on the initialization line is written to the anode of the light-emitting device through the sixth transistor, thereby achieving the initialization of the anode of the light-emitting device.

The operating processes of the first initialization stage, and the reset stage and the light emission stage of the idle frame are respectively the same as those of the reset stage and the light emission stage in the drive timing of the writing frame shown in FIG. 17, which will not be repeated here.

Figure 18:
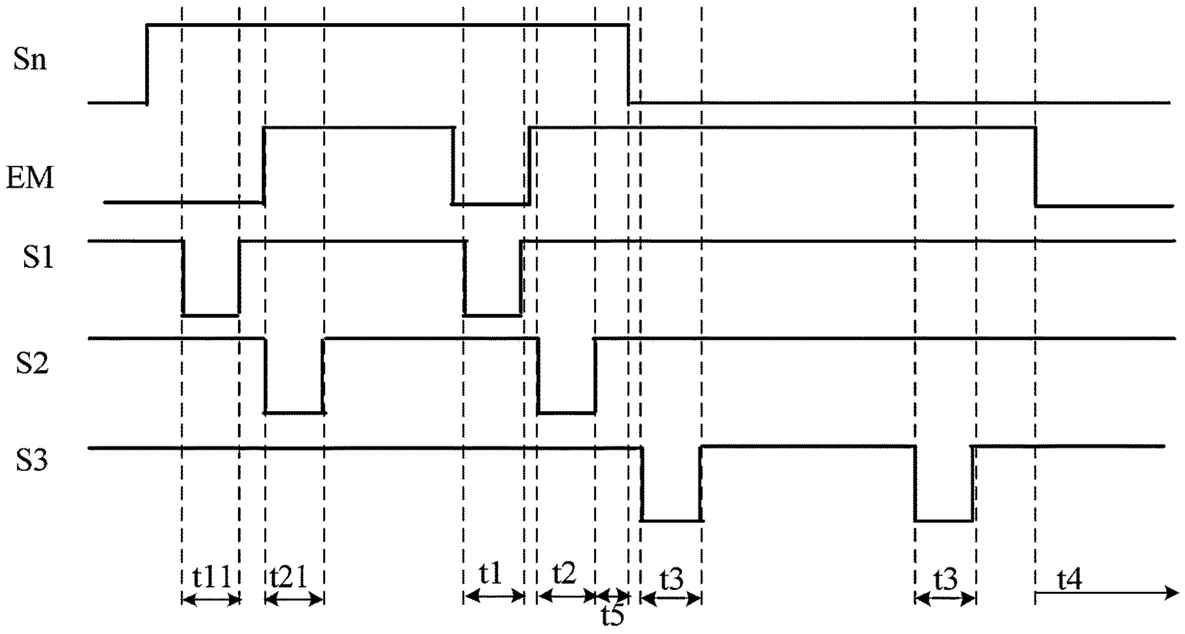
FIG. 18 is a drive timing diagram of a writing frame of another pixel circuit according to an embodiment of the present application.

FIG. 18 is a drive timing diagram of a writing frame of another pixel circuit according to an embodiment of the present application, and the drive timing can be used to drive the pixel circuit shown in FIG. 11. With reference to FIG. 11 and FIG. 18, in the writing frame, the operating process of the pixel circuit includes a second initialization stage t11, a pre-charging stage t21, a first initialization stage t1, a data writing stage t2, a reset stage t3, and a light emission stage t4 that are performed sequentially.

In the second initialization stage t11, a light emission control signal on the light emission control signal line is at a low level, a first scan signal on the first scan line S1 is at a low level, signals on the second scan line S2 and the third scan line S3 are at a high level, and a compensation control signal on the compensation control signal line Sn is at a high level. Therefore, the sixth transistor T6 is turned on in response to the low-level first scan signal, the fourth transistor T4 is turned on in response to the low-level light emission control signal, and the second transistor T2 is turned on in response to the high-level compensation control signal, and an initialization voltage on the initialization line Vref is written to the anode of the light-emitting device D1 through the sixth transistor T6, thereby achieving the initialization of the anode of the light-emitting device D1. At the same time, the initialization voltage is also written to the gate of the driving transistor DT through the sixth transistor T6, the fourth transistor T4, and the second transistor T2, thereby achieving the initialization of the gate of the driving transistor DT. At the same time, the third transistor T3 is turned on in response to the low-level light emission control signal, and there is a large current between the first power line VDD and the initialization line Vref, which helps to reduce image retention.

In the pre-charging stage t21, the second scan signal on the second scan line S2 is at a low level, and the other control signals are all at a high level, and therefore the first transistor T1 is turned on in response to the low-level second scan signal, and the second transistor T2 is turned on in response to the high-level compensation control signal, and the pre-charging voltage is written to the gate of the driving transistor DT through the first transistor T1, the driving transistor DT, and the second transistor T2.

In the first initialization stage t1, the data writing stage t2, the reset stage t3, and the light emission stage t4, the operating states of the transistors in the pixel circuit are respectively the same as those of the transistors in the first initialization stage t1, the data writing stage t2, the reset stage t3, and the light emission stage t4 corresponding to the drive timing shown in FIG. 12, which will not be repeated here.

Based on the same reasons as those for the drive timings in FIG. 13, FIG. 15, and FIG. 17, the pixel circuit according to this embodiment can improve the display uniformity and alleviate image retention, which will not be repeated here.

The drive timing of the pixel circuit shown in FIG. 11 in the idle frame differs from the drive timing of the writing frame shown in FIG. 18 only in that, in the idle frame, the compensation control signal is always at a low level, while the other control signals are the same as those in the writing frame. The operating process of the pixel circuit shown in FIG. 11 in the idle frame includes a second initialization stage, a first initialization stage, a reset stage, and a light emission stage that are performed sequentially.

In the second initialization stage, a light emission control signal on the light emission control signal line is at a low level, a first scan signal on the first scan line is at a low level, signals on the second scan line and the third scan line are at a high level, and a compensation control signal on the compensation control signal line is at a low level. Therefore, the sixth transistor is turned on in response to the low-level first scan signal, and the fourth transistor is turned on in response to the low-level light emission control signal, and an initialization voltage on the initialization line is written to the anode of the light-emitting device through the sixth transistor, thereby achieving the initialization of the anode of the light-emitting device. At the same time, the third transistor is turned on in response to the low-level light emission control signal, and there is a large current between the first power line and the initialization line, which helps to reduce image retention.

The operating processes of the first initialization stage, the reset stage of the idle frame, and the light emission stage are respectively the same as those of the first initialization stage, the reset stage, and the light emission stage in the drive timing of the writing frame shown in FIG. 18, which will not be repeated here.

Figure 19:
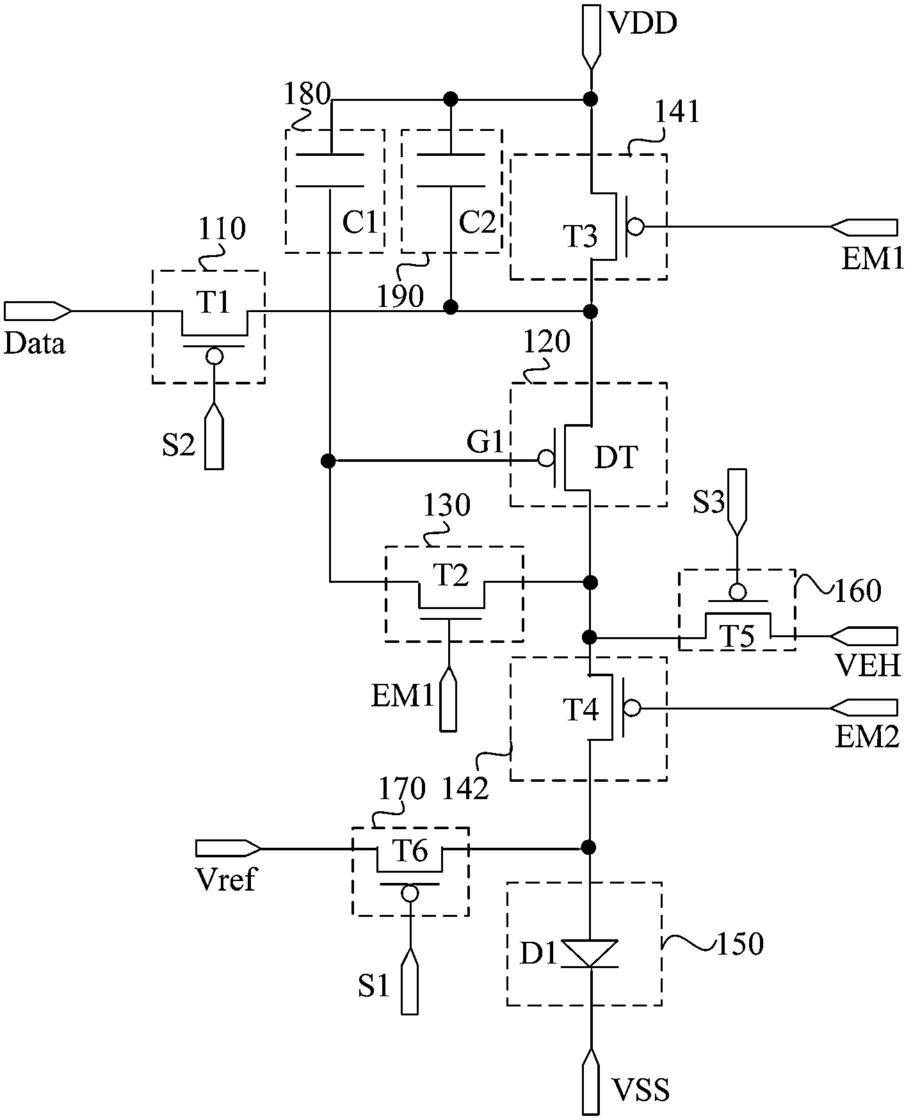
FIG. 19 is a schematic diagram of a structure of another pixel circuit according to an embodiment of the present application.

FIG. 19 is a schematic diagram of a structure of another pixel circuit according to an embodiment of the present application, and FIG. 19 may correspond to another structure in which the modules in FIG. 1 are detailed as circuit devices. FIG. 19 differs from FIG. 3 only in that, in FIG. 19, the compensation module 130 (the second transistor T2) is connected to the first light emission control signal line EM1, and the other structures and connection relationships in the pixel circuit are the same as those in FIG. 3, which will not be repeated here. FIG. 19 differs from FIG. 11 only in that, in FIG. 19, the first light emission control unit 141 is connected to the first light emission control line, the second light emission control unit 142 is connected to the second light emission control line, and the other structures and connection relationships are the same as those in FIG. 11.

Figure 20:
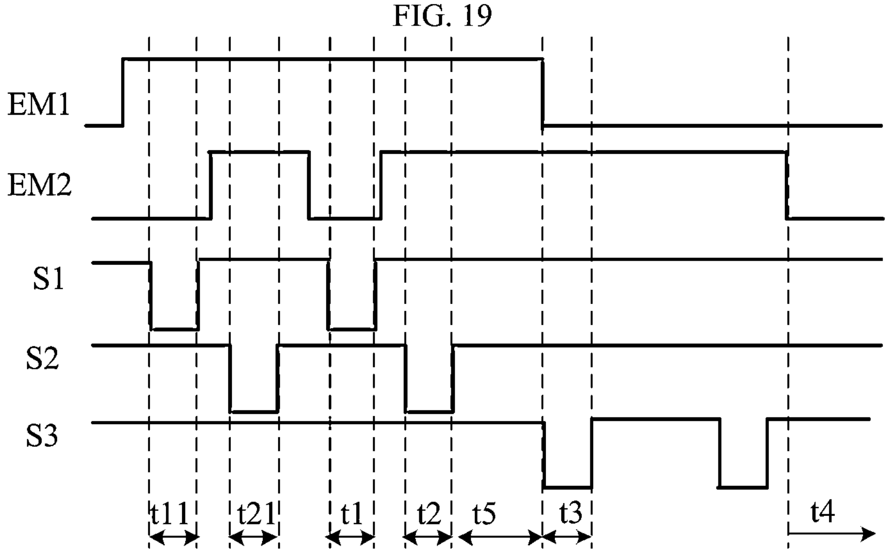
FIG. 20 is a drive timing diagram of a writing frame of another pixel circuit according to an embodiment of the present application.

FIG. 20 is a drive timing diagram of a writing frame of another pixel circuit according to an embodiment of the present application, and the drive timing can be used to drive the pixel circuit shown in FIG. 19. With reference to FIG. 19 and FIG. 20, in the writing frame, the operating process of the pixel circuit includes a second initialization stage t11, a pre-charging stage t21, a first initialization stage t1, a data writing stage t2, a reset stage t3, and a light emission stage t4 that are performed sequentially.

In the second initialization stage t11, a first light emission control signal on the first light emission control signal line EM1 is at a high level, a second light emission control signal on the second light emission control signal line EM2 is at a low level, a first scan signal on the first scan line S1 is at a low level, and signals on the second scan line S2 and the third scan line S3 are at a high level. Therefore, the sixth transistor T6 is turned on in response to the low-level first scan signal, the fourth transistor T4 is turned on in response to the low-level second light emission control signal, and the second transistor T2 is turned on in response to the high-level first light emission control signal, and an initialization voltage on the initialization line Vref is written to the anode of the light-emitting device D1 through the sixth transistor T6, thereby achieving the initialization of the anode of the light-emitting device D1. At the same time, the initialization voltage is also written to the gate of the driving transistor DT through the sixth transistor T6, the fourth transistor T4, and the second transistor T2, thereby achieving the initialization of the gate of the driving transistor DT.

In the pre-charging stage t21, the second scan signal on the second scan line S2 is at a low level, and the other control signals are all at a high level, and therefore the first transistor T1 is turned on in response to the low-level second scan signal, and the second transistor T2 is turned on in response to the high-level first light emission control signal, and the pre-charging voltage is written to the gate of the driving transistor DT through the first transistor T1, the driving transistor DT, and the second transistor T2.

In the first initialization stage t1, the operating states of the transistors in the pixel circuit are the same as the processes in the second initialization stage t11, which will not be repeated here.

In the data writing stage t2, the second scan signal on the second scan line S2 is at a low level, and the other control signals in the pixel circuit are at a high level, and therefore the first transistor T1 is turned on in response to the low-level second scan signal, and the second transistor T2 is turned on in response to the high-level first light emission control signal, and the data voltage is written to the gate of the driving transistor DT through the first transistor T1, the driving transistor DT, and the second transistor T2, thereby achieving the compensation of the threshold voltage of the driving transistor DT at the same time.

In the reset stage t3, the third scan signal is at a low level, the first light emission control signal is at a low level, and the other control signals in the pixel circuit are all at a high level, and therefore the fifth transistor T5 is turned on in response to the low-level third scan signal, and the reset voltage VEH is written to the drain of the driving transistor DT through the fifth transistor T5, and is written to the source of the driving transistor DT through the driving transistor DT.

In the light emission stage t4, the first light emission control signal and the second light emission control signal are at a low level, and therefore the third transistor T3 and the fourth transistor T4 are turned on, and the driving transistor DT drives the light-emitting device D1 to emit light.

Based on the same reasons as those for the drive timings in FIG. 13, FIG. 15, FIG. 17, and FIG. 18, the pixel circuit according to this embodiment can improve the display uniformity and alleviate image retention, which will not be repeated here.

The drive timing of the pixel circuit shown in FIG. 19 in the idle frame differs from the drive timing of the writing frame in FIG. 20 only in that, in the idle frame, the first light emission control signal is always at a low level, while the other control signals are the same as those in the writing frame. The operating process of the pixel circuit shown in FIG. 9 in the idle frame includes a second initialization stage t11, a first initialization stage t1, a reset stage t3, and a light emission stage t4 that are performed sequentially.

In the second initialization stage t11, a first light emission control signal on the first light emission control signal line EM1 is at a low level, a second light emission control signal on the second light emission control signal line EM2 is at a low level, a first scan signal on the first scan line S1 is at a low level, and signals on the second scan line S2 and the third scan line S3 are at a high level. Therefore, the sixth transistor T6 is turned on in response to the low-level first scan signal, and the fourth transistor T4 is turned on in response to the low-level second light emission control signal, and an initialization voltage on the initialization line Vref is written to the anode of the light-emitting device D1 through the sixth transistor T6, thereby achieving the initialization of the anode of the light-emitting device D1. At the same time, the third transistor T3 is turned on in response to the low-level first light emission control signal, and there is a large current between the first power line VDD and the initialization line Vref, which helps to reduce image retention.

The operating processes of the first initialization stage t1, the reset stage t3 of the idle frame, and the light emission stage t4 are respectively the same as those of the first initialization stage t1, the reset stage t3, and the light emission stage t4 in the drive timing of the writing frame shown in FIG. 20, which will not be repeated here.

In an embodiment of the present application, various control signals (including a signal applied to the control terminal of the data writing module, a signal applied to the control terminal of the compensation module, a signal applied to the control terminal of the initialization module, a signal applied to the control terminal of the reset module, a signal applied to the control terminal of the first light emission control unit, and a signal applied to the control terminal of the second light emission control unit) may be provided by different gate driver circuits. The duration of the reset stage is adjustable in both the writing frame and the idle frame, that is, an effective pulse width of the signal applied to the control terminal of the reset module is adjustable. In one embodiment, the duration of the reset stage of the idle frame is longer than that of the reset stage of the writing frame. The gate of the driving transistor is initialized in the first initialization stage and the second initialization stage of the writing frame, while the gate of the driving transistor is not initialized in the first initialization stage and the second initialization stage of the idle frame. In addition, the writing frame includes a data writing stage in which the transistor is driven to be turned on, whereas the idle frame does not include the data writing stage. Therefore, the characteristics of the driving transistor differ between the writing frame and the idle frame. In this embodiment, the difference in the characteristics of the driving transistor between the writing frame and the idle frame can be reduced by setting the duration of the reset stage in the idle frame to be longer than that in the reset stage of the writing frame, thereby contributing to the improvement of the display quality.

On the basis of the various embodiments described above, with reference to FIG. 3, FIG. 4, FIG. 9, FIG. 11, and FIG. 19, in one embodiment, the pixel circuit further includes a first storage module 180, where a first terminal of the first storage module 180 is connected to the first power line VDD, and a second terminal of the first storage module 180 is connected to the control terminal of the driving module 120. The first storage module 180 is configured to store and maintain the potential at the control terminal of the driving module 120.

Continuing with reference to FIG. 3, FIG. 4, FIG. 9, FIG. 11, and FIG. 19, in one embodiment, the pixel circuit further includes a second storage module 190, where a first terminal of the second storage module 190 is connected to the first power line VDD, and a second terminal of the second storage module 190 is connected to the first terminal of the driving module 120.

Continuing with reference to FIG. 5, FIG. 7, FIG. 10, FIG. 13, FIG. 15, FIG. 17, FIG. 18, and FIG. 20, the writing frame further includes a sub-threshold compensation stage t5, and the compensation module 130 is further configured to be turned on in the sub-threshold compensation stage t5, where the sub-threshold compensation stage t5 is between the data writing stage t2 and the reset stage t3 of the writing frame.

In one embodiment, the first storage module 180 includes a first capacitor, and the second storage module 190 includes a second capacitor.

With reference to FIG. 3, FIG. 5, and FIG. 13, in the sub-threshold compensation stage t5, the compensation control signal is at a high level, and the other control signals are also all at a high level, and therefore the second transistor T2 included in the compensation module 130 is turned on in response to the high-level compensation control signal, and the current generated by the driving transistor DT continues charging the gate of the driving transistor DT through the second transistor T2.

With reference to FIG. 4, FIG. 7, and FIG. 15, in the sub-threshold compensation stage t5, the first light emission control signal is at a high level, and the other control signals are also all at a high level, and therefore the second transistor T2 included in the compensation module 130 is turned on in response to the high-level first light emission control signal, and the current generated by the driving transistor DT continues charging the gate of the driving transistor DT through the second transistor T2.

With reference to FIG. 9, FIG. 10, and FIG. 17, in the sub-threshold compensation stage t5, the compensation control signal is at a high level, and the other control signals are also all at a high level, and therefore the second transistor T2 included in the compensation module 130 is turned on in response to the high-level compensation control signal, and the current of the driving transistor DT continues charging the gate of the driving transistor DT through the second transistor T2.

With reference to FIG. 11, FIG. 12, and FIG. 18, in the sub-threshold compensation stage t5, the compensation control signal is at a high level, and the other control signals are also all at a high level, and therefore the second transistor T2 included in the compensation module 130 is turned on in response to the high-level compensation control signal, and the current of the driving transistor DT continues charging the gate of the driving transistor DT through the second transistor T2.

With reference to FIG. 19 and FIG. 20, in the sub-threshold compensation stage t5, the first light emission control signal is at a high level, and the other control signals are also all at a high level, and therefore the second transistor T2 included in the compensation module 130 is turned on in response to the high-level first light emission control signal, and the current of the driving transistor DT continues charging the gate of the driving transistor DT through the second transistor T2.

The sub-threshold swing, also known as the S-factor, is numerically equal to the gate voltage increment required to cause a one-order-of-magnitude change in the driving current between the source and the drain of the driving transistor DT. The magnitude of the sub-threshold swing affects the magnitude of the driving current generated by the driving transistor DT. For two driving transistors DT with different the sub-threshold swings, when the gate-source voltage differences are the same, the driving current generated by the driving transistors DT is different in magnitude. When the gate-source voltage differences are the same, the greater the sub-threshold swing, the greater the driving current generated by the driving transistor DT at a set grayscale, where the set grayscale may correspond to a grayscale range when the driving current generated by the driving transistor DT is lower than the set current threshold. Therefore, inconsistencies in the sub-threshold swing also affect the display uniformity of the display panel. The pixel circuit according to this embodiment further includes a second storage module 190, where the second storage module 190 maintains the potential at the first terminal of the driving module 120 (a first electrode of the driving transistor DT) in the sub-threshold swing compensation stage. Since the sub-threshold swing compensation stage follows the data writing stage t2, and the data writing module 110 is electrically connected to the first electrode of the driving transistor DT, the second storage module 190 maintains the data voltage of the first electrode of the driving transistor DT in the sub-threshold swing compensation stage. The compensation module 130 is turned on in the sub-threshold swing compensation stage, and the current generated by the driving transistor DT continues charging the gate of the driving transistor DT. In the sub-threshold swing compensation stage, the gate potential change amount of the driving transistor DT is denoted as ΔV. Since the gate potential of the driving transistor DT is Vdata+Vth after the completion of the data writing stage t2, the gate potential of the driving transistor DT after the sub-threshold swing compensation stage is Vdata+Vth+ΔV. Since at the set grayscale, the larger the sub-threshold swing of the driving transistor DT, the higher the current of the driving transistor DT itself, the gate potential change amount ΔV of the driving transistor DT in the sub-threshold swing compensation stage is also larger. Based on the calculation formula for the driving current of the driving transistor DT:

$$I=\frac{1}{2}\mu C_{ox}\frac{W}{L}(Vgs-Vth)2=\frac{1}{2}\mu C_{ox}\frac{W}{L}(Vdata+Vth+\Delta V-Vdd-Vth)^2=\frac{1}{2}\mu C_{ox}\frac{W}{L}(Vdata-Vdd+\Delta V)^2;$$

where μ represents the carrier mobility, $C_{ox}$ is the gate oxide capacitance (the capacitance per unit area of the gate oxide), W/L is the width-to-length ratio of the driving transistor DT, Vgs represents the voltage difference between the gate and the first electrode of the driving transistor DT, Vth represents the threshold voltage of the driving transistor DT, Vdata represents the data voltage, and Vdd represents the first power supply voltage that is input to the input terminal of the first power supply voltage.

Taking the case where the driving transistor DT is a P-type transistor as an example, both the data voltage and the first power supply voltage voltage on the first power line VDD are positive voltages, and the data voltage is less than the first power supply voltage, and therefore Vdata−Vdd<0. However, since the data voltage is a positive voltage, the gate voltage of the driving transistor DT gradually increases in the sub-threshold swing stage, that is, ΔV>0. Based on the aforementioned calculation formula for the driving current, when the data voltage does not change, the larger the gate potential change amount ΔV, the smaller the absolute value of |Vdata−Vdd+ΔV|, and the lower the driving current. Therefore, by compensating for the sub-threshold swing in the sub-threshold swing compensation stage, the current of the driving transistor DT that is generated by the driving transistor DT with a larger sub-threshold swing is reduced more under the same data voltage at the set the grayscale. As a result, the driving currents of the driving transistors DT with different sub-threshold swings under the same data voltage at the set grayscale tends to become consistent, thereby mitigating the display non-uniformity in the display panel caused by differences in sub-threshold swings of the driving transistors DT at the set grayscale. When the driving transistor DT is an N-type transistor, the operating principle is similar to that of the P-type driving transistor DT described above, which will not be repeated here.

Figure 21:
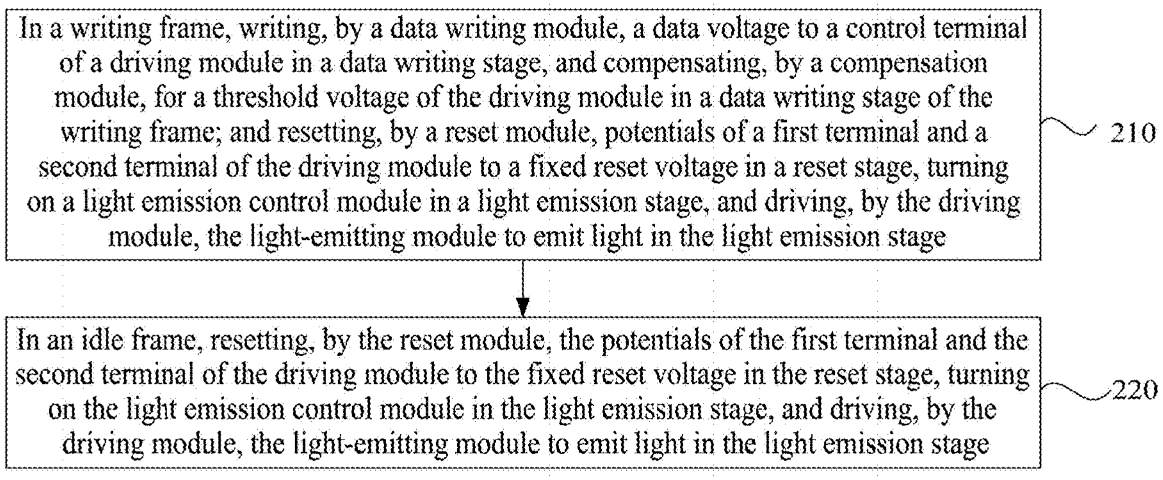
FIG. 21 is a flowchart of a driving method for a pixel circuit according to an embodiment of the present application.

An embodiment of the present application further provides a driving method for a pixel circuit. FIG. 21 is a flowchart of a driving method for a pixel circuit according to an embodiment of the present application. With reference to FIG. 21, the driving method for a pixel circuit includes: Step 210: In a writing frame, writing, by a data writing module, a data voltage to a control terminal of a driving module in a data writing stage, and compensating, by a compensation module, for a threshold voltage of the driving module in a data writing stage of the writing frame; and resetting, by a reset module, potentials of a first terminal and a second terminal of the driving module to a fixed reset voltage in a reset stage, turning on a light emission control module in a light emission stage, and driving, by the driving module, the light-emitting module to emit light in the light emission stage.

In the writing frame, the reset stage is between the data writing stage and the light emission stage.

For example, in the data writing stage of the writing frame, a valid signal is input to the control terminal of the data writing module through a control signal line connected to the control terminal of the data writing module, causing the data writing module to be turned on in the data writing stage of the writing frame, and the data writing module writes a data voltage to the control terminal of the driving module; and in the data writing stage of the writing frame, a valid signal is input to the control terminal of the compensation module through a control signal line connected to the control terminal of the compensation module, causing the compensation module to be turned on in the data writing stage of the writing frame, and the compensation module compensates for the threshold voltage of the driving module in the data writing stage of the writing frame.

In the reset stage of the writing frame, a valid signal is input to the control terminal of the reset module through a control signal line connected to the control terminal of the reset module, causing the reset module to be turned on in the reset stage of the writing frame, and the reset module resets the potentials of the first terminal and the second terminal of the driving module to the fixed reset voltage in the reset stage.

In the light emission stage of the writing frame, a valid signal is input to the control terminal of the light emission control module through a control signal line connected to the control terminal of the light emission control module, causing the light emission control module to be turned on in the light emission stage of the writing frame, and the driving module drives the light-emitting module to emit light in the light emission stage.

Step 220: In an idle frame, resetting, by the reset module, the potentials of the first terminal and the second terminal of the driving module to the fixed reset voltage in the reset stage, turning on the light emission control module in the light emission stage, and driving, by the driving module, the light-emitting module to emit light in the light emission stage.

In the idle frame, the reset stage precedes the light emission stage.

In the reset stage of the idle frame, a valid signal is input to the control terminal of the reset module through a control signal line connected to the control terminal of the reset module, causing the reset module to be turned on in the reset stage of the idle frame, and the reset module resets the potentials of the first terminal and the second terminal of the driving module to the fixed reset voltage in the reset stage.

In the light emission stage of the idle frame, a valid signal is input to the control terminal of the light emission control module through a control signal line connected to the control terminal of the light emission control module, causing the light emission control module to be turned on in the light emission stage of the idle frame, and the driving module drives the light-emitting module to emit light in the light emission stage.

This driving method is used to drive the pixel circuit according to any one of the aforementioned embodiments of the present application, which will not be repeated here.

Figure 22:
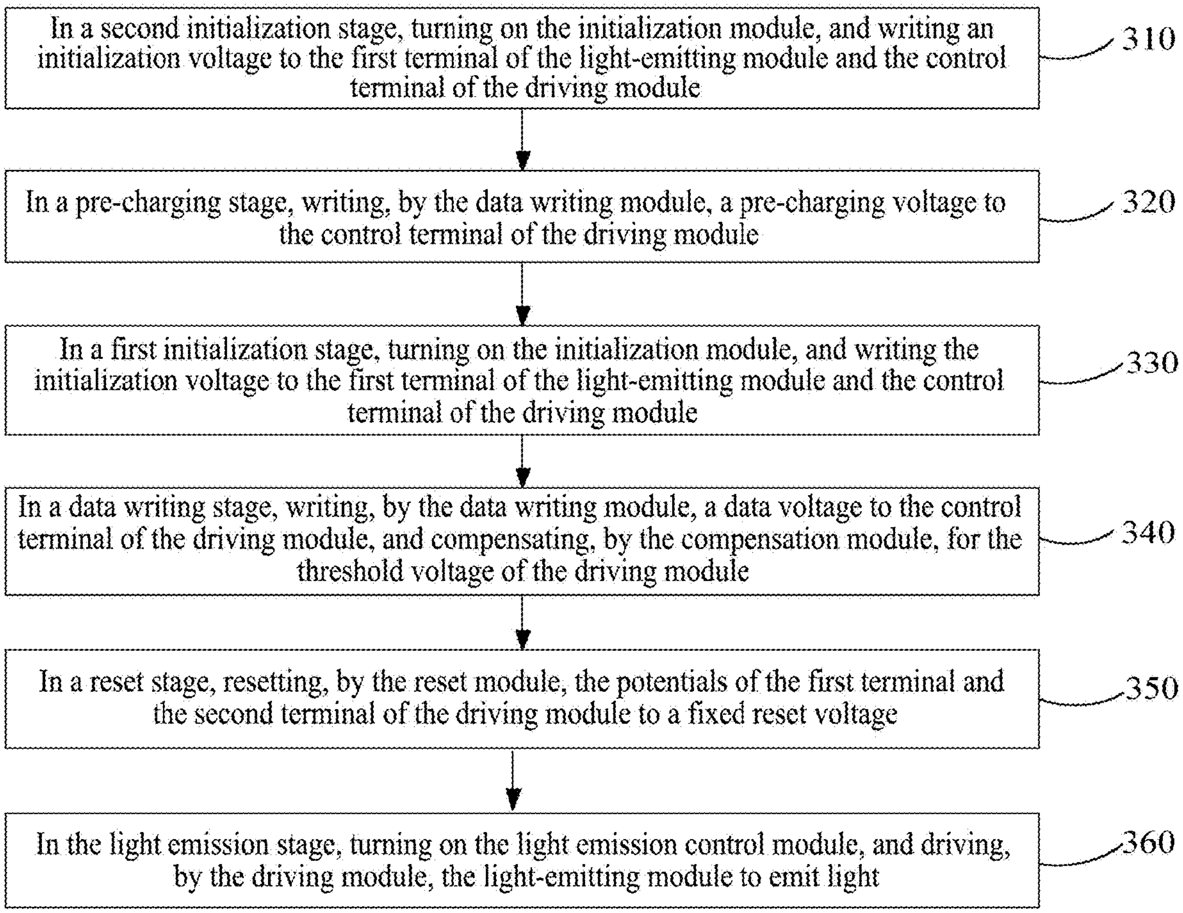
FIG. 22 is a flowchart of a driving method for a pixel circuit in a writing frame according to an embodiment of the present application.

On the basis of the aforementioned embodiments, the light emission control module includes a first light emission control unit and a second light emission control unit, and the pixel circuit further includes an initialization module. FIG. 22 is a flowchart of a driving method for a pixel circuit in a writing frame according to an embodiment of the present application.

With reference to FIG. 22, the driving method for a pixel circuit in a writing frame includes:

Step 310: In a second initialization stage, turning on the initialization module, and writing an initialization voltage to the first terminal of the light-emitting module and the control terminal of the driving module.

The second light emission control unit and the compensation module are turned on in the second initialization stage, and the initialization voltage is written to the control terminal of the driving module through the initialization module, the second light emission control unit, and the compensation module.

In the second initialization stage, a valid signal is input to the control terminal of the initialization module through a control signal line connected to the control terminal of the initialization module, causing the initialization module to be turned on, and the initialization voltage is written to the first terminal of the light-emitting module. A valid signal is input to the control terminal of the second light emission control unit through a control signal line connected to the control terminal of the second light emission control unit, causing the second light emission control unit to be turned on; and a valid signal is input to the control terminal of the compensation module through a control signal line connected to the control terminal of the compensation module, causing the compensation module to be turned on, and the initialization voltage is written to the control terminal of the driving module through the initialization module, the second light emission control unit, and the compensation module.

Step 320: In a pre-charging stage, writing, by the data writing module, a pre-charging voltage to the control terminal of the driving module. In one embodiment, the pre-charging voltage is a data voltage corresponding to the upper n rows of pixel circuits in the same column as the pixel circuit, where n≥2.

In the pre-charging stage, a valid signal is input to the control terminal of the data writing module through a control signal line connected to the control terminal of the data writing module, causing the data writing module to be turned on, and a valid signal is input to the control terminal of the compensation module through a control signal line connected to the control terminal of the compensation module, causing the compensation module to be turned on, and the pre-charging voltage is written to the control terminal of the driving module through the data writing module, the driving module, and the compensation module.

Step 330: In a first initialization stage, turning on the initialization module, and writing the initialization voltage to the first terminal of the light-emitting module and the control terminal of the driving module.

The second light emission control unit and the compensation module are turned on in the first initialization stage, and the initialization voltage is written to the control terminal of the driving module through the initialization module, the second light emission control unit, and the compensation module.

In the first initialization stage, a valid signal is input to the control terminal of the initialization module through the control signal line connected to the control terminal of the initialization module, causing the initialization module to be turned on, and the initialization voltage is written to the first terminal of the light-emitting module. A valid signal is input to the control terminal of the second light emission control unit through a control signal line connected to the control terminal of the second light emission control unit, causing the second light emission control unit to be turned on; and a valid signal is input to the control terminal of the compensation module through a control signal line connected to the control terminal of the compensation module, causing the compensation module to be turned on, and the initialization voltage is written to the control terminal of the driving module through the initialization module, the second light emission control unit, and the compensation module.

Step 340: In a data writing stage, writing, by the data writing module, a data voltage to the control terminal of the driving module, and compensating, by the compensation module, for the threshold voltage of the driving module.

In the data writing stage, a valid signal is input to the control terminal of the data writing module through a control signal line connected to the control terminal of the data writing module, causing the data writing module to be turned on in the data writing stage of the writing frame, and the data writing module writes a data voltage to the control terminal of the driving module; and in the data writing stage, a valid signal is input to the control terminal of the compensation module through a control signal line connected to the control terminal of the compensation module, causing the compensation module to be turned on in the data writing stage of the writing frame, and the compensation module compensates for the threshold voltage of the driving module in the data writing stage of the writing frame.

Step 350: In a reset stage, resetting, by the reset module, the potentials of the first terminal and the second terminal of the driving module to a fixed reset voltage.

In the reset stage, a valid signal is input to the control terminal of the reset module through a control signal line connected to the control terminal of the reset module, causing the reset module to be turned on in the reset stage, and the reset module resets the potentials of the first terminal and the second terminal of the driving module to the fixed reset voltage in the reset stage.

Step 360: In the light emission stage, turning on the light emission control module, and driving, by the driving module, the light-emitting module to emit light.

In the light emission stage, a valid signal is input to the control terminal of the light emission control module through a control signal line connected to the control terminal of the light emission control module, causing the light emission control module to be turned on in the light emission stage, and the driving module drives the light-emitting module to emit light in the light emission stage.

In the writing frame, the second initialization stage precedes the first initialization stage, the pre-charging stage is between the first initialization stage and the second initialization stage, and the data writing stage follows the first initialization stage.

Figure 23:
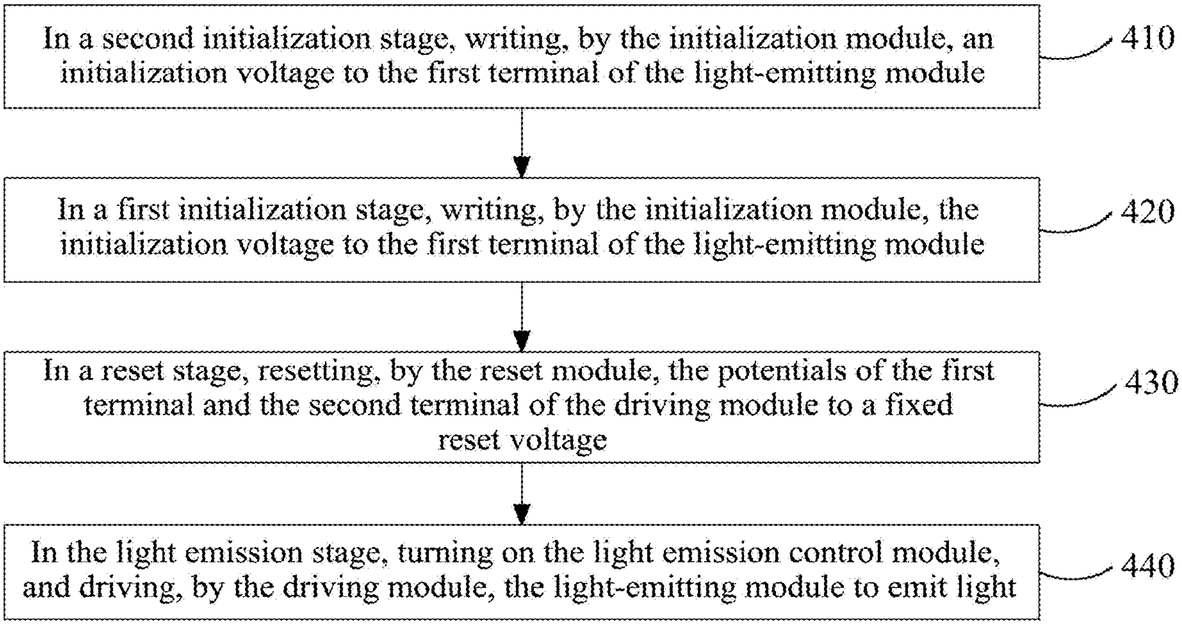
FIG. 23 is a flowchart of a driving method for a pixel circuit in an idle frame according to an embodiment of the present application.

FIG. 23 is a flowchart of a driving method for a pixel circuit in an idle frame according to an embodiment of the present application. With reference to FIG. 23, the driving method for a pixel circuit in an idle frame includes:

Step 410: In a second initialization stage, writing, by the initialization module, an initialization voltage to the first terminal of the light-emitting module.

In the second initialization stage, a valid signal is input to the control terminal of the initialization module through a control signal line connected to the control terminal of the initialization module, causing the initialization module to be turned on, and the initialization voltage is written to the first terminal of the light-emitting module.

Step 420: In a first initialization stage, writing, by the initialization module, the initialization voltage to the first terminal of the light-emitting module.

In the first initialization stage, a valid signal is input to the control terminal of the initialization module through the control signal line connected to the control terminal of the initialization module, causing the initialization module to be turned on, and the initialization voltage is written to the first terminal of the light-emitting module.

Step 430: In a reset stage, resetting, by the reset module, the potentials of the first terminal and the second terminal of the driving module to a fixed reset voltage.

In the reset stage, a valid signal is input to the control terminal of the reset module through a control signal line connected to the control terminal of the reset module, causing the reset module to be turned on in the reset stage, and the reset module resets the potentials of the first terminal and the second terminal of the driving module to the fixed reset voltage in the reset stage.

Step 440: In the light emission stage, turning on the light emission control module, and driving, by the driving module, the light-emitting module to emit light.

In the light emission stage, a valid signal is input to the control terminal of the light emission control module through a control signal line connected to the control terminal of the light emission control module, causing the light emission control module to be turned on in the light emission stage, and the driving module drives the light-emitting module to emit light in the light emission stage.

An embodiment of the present application further provides a display panel, the display panel includes the pixel circuit provided in the embodiments of the present application.

What is claimed is:

1. A pixel circuit, comprising:

a data writing module, a driving module, a compensation module, a light emission control module, and a light-emitting module, wherein the data writing module is configured to write a data voltage to a control terminal of the driving module in a data writing stage of a writing frame;

the compensation module is configured to compensate for a threshold voltage of the driving module in the data writing stage of the writing frame; and the light emission control module is configured to be turned on in light emission stages of the writing frame and an idle frame, and the driving module is configured to drive the light-emitting module to emit light in the light emission stages; and the pixel circuit further comprising a reset module, wherein the reset module is electrically connected to a first terminal of the driving module or a second terminal of the driving module, and the reset module is configured to reset potentials of the first terminal of the driving module and the second terminal of the driving module to a fixed reset voltage in a reset stage, wherein in the writing frame, the reset stage is between the data writing stage and the light emission stage; and in the idle frame, the reset stage precedes the light emission stage.

2. The pixel circuit according to claim 1, wherein the light emission control module comprises a first light emission control unit and a second light emission control unit, wherein the first light emission control unit is connected in series between a first power line and the first terminal of the driving module; and the second light emission control unit is connected in series between the second terminal of the driving module and a first terminal of the light-emitting module, with a second terminal of the light-emitting module being electrically connected to a second power line; and a first terminal of the data writing module is electrically connected to a data line, and a second terminal of the data writing module is electrically connected to the first terminal of the driving module.

3. The pixel circuit according to claim 2, wherein the reset module comprises the first light emission control unit and the data writing module; and the data line is configured to transmit the data voltage in the data writing stage of the writing frame and transmit a first power supply voltage in the reset stage of the idle frame, wherein the first light emission control unit is configured to write the first power supply voltage to the first terminal of the driving module and the second terminal of the driving module in the reset stage of the writing frame; and the data writing module is configured to write the first power supply voltage to the first terminal of the driving module and the second terminal of the driving module in the reset stage of the idle frame;

or a first terminal of the reset module is connected to the reset voltage, and a second terminal of the reset module is electrically connected to the second terminal of the driving module; and the reset module is configured to write the reset voltage to the first terminal of the driving module and the second terminal of the driving module in the reset stage under the control of a signal applied to a control terminal of the reset module.

4. The pixel circuit according to claim 3, wherein the driving module comprises a driving transistor that is a P-type transistor, and the reset voltage is higher than the data voltage.

5. The pixel circuit according to claim 3, further comprising an initialization module, wherein the initialization module is configured to write an initialization voltage to the first terminal of the light-emitting module and the control terminal of the driving module in a first initialization stage of the writing frame, wherein in the writing frame, the first initialization stage precedes the data writing stage; and the initialization module is further configured to write the initialization voltage to the first terminal of the light-emitting module in a first initialization stage of the idle frame, wherein in the idle frame, the first initialization stage precedes the reset stage.

6. The pixel circuit according to claim 5, wherein the initialization module is further configured to write the initialization voltage to the first terminal of the light-emitting module and the control terminal of the driving module in a second initialization stage of the writing frame, wherein the second initialization stage precedes the first initialization stage.

7. The pixel circuit according to claim 6, wherein the writing frame further comprises a pre-charging stage, and the data writing module is further configured to write a pre-charging voltage to the control terminal of the driving module in the pre-charging stage of the writing frame, wherein the pre-charging voltage is a data voltage corresponding to the upper n rows of pixel circuits in the same column as the pixel circuit, where $n \geq 2$; and in the writing frame, the pre-charging stage is between the second initialization stage and the first initialization stage, and the data writing stage follows the first initialization stage.

8. The pixel circuit according to claim 6, wherein the initialization module is further configured to be turned on in a second initialization stage of the idle frame, wherein in the idle frame, the second initialization stage precedes the first initialization stage.

9. The pixel circuit according to claim 5, wherein a control terminal of the initialization module is connected to a first scan line, and a control terminal of the data writing module is connected to a second scan line, the first scan line and the second scan line being connected to the same scan driver circuit.

10. The pixel circuit according to claim 9, wherein the control terminal of the reset module is connected to a third scan line, the first scan line, the second scan line, and the third scan line being connected to the same scan driver circuit.

11. The pixel circuit according to claim 2, wherein the pixel circuit further comprises a first storage module, wherein a first terminal of the first storage module is connected to the first power line, and a second terminal of the first storage module is connected to the control terminal of the driving module; and the pixel circuit further comprises a second storage module, wherein a first terminal of the second storage module is connected to the first power line, and a second terminal of the second storage module is connected to the first terminal of the driving module; and the writing frame further comprises a sub-threshold compensation stage, and the compensation module is further configured to be turned on in the sub-threshold compensation stage, wherein the sub-threshold compensation stage is between the data writing stage and the reset stage of the writing frame.

12. The pixel circuit according to claim 2, wherein a control terminal of the first light emission control unit is connected to a first light emission control line, and a control terminal of the second light emission control unit is connected to a second light emission control line;

the compensation module is connected between the second terminal of the driving module and the control terminal of the driving module, and a control terminal of the compensation module is connected to the first light emission control line; and a transistor comprised in the first light emission control unit has a channel type opposite to that of a transistor comprised in the compensation module;

or the first terminal of the reset module is connected to the reset voltage, and the second terminal of the reset module is electrically connected to the second terminal of the driving module; and the compensation module is connected between the second terminal of the driving module and the control terminal of the driving module, and a control terminal of the compensation module is connected to a compensation control signal line.

13. The pixel circuit according to claim 3, wherein the first terminal of the reset module is connected to the reset voltage, and the second terminal of the reset module is electrically connected to the second terminal of the driving module; and a control terminal of the first light emission control unit and a control terminal of the second light emission control unit are electrically connected to the same light emission control line, and a control terminal of the compensation module is electrically connected to a compensation control signal line.

14. The pixel circuit according to claim 3, wherein the first terminal of the reset module is connected to the reset voltage, and the second terminal of the reset module is electrically connected to the second terminal of the driving module; and the pixel circuit further comprises an initialization module; a control terminal of the first light emission control unit is connected to a first light emission control line, and a control terminal of the second light emission control unit is connected to a second light emission control line;

the compensation module is connected between the second terminal of the driving module and the control terminal of the driving module, and a control terminal of the compensation module is connected to a compensation control signal line;

a control terminal of the initialization module is connected to the first light emission control line, and a transistor comprised in the first light emission control unit has a channel type opposite to that of a transistor comprised in the initialization module; and a control terminal of the data writing module is connected to a first scan line, and the control terminal of the reset module is connected to a second scan line.

15. The pixel circuit according to claim 14, wherein the first scan line and the second scan line are connected to the same scan driver circuit.

16. A driving method for a pixel circuit, comprising:

in a writing frame, writing, by a data writing module, a data voltage to a control terminal of a driving module in a data writing stage, and compensating, by a compensation module, for a threshold voltage of the driving module in a data writing stage of the writing frame; resetting, by a reset module, potentials of a first terminal of the driving module and a second terminal of the driving module to a fixed reset voltage in a reset stage, turning on a light emission control module in a light emission stage, and driving, by the driving module, a light-emitting module to emit light in the light emission stage; and in an idle frame, resetting, by the reset module, the potentials of the first terminal of the driving module and the second terminal of the driving module to the fixed reset voltage in the reset stage, turning on the light emission control module in the light emission stage, and driving, by the driving module, the light-emitting module to emit light in the light emission stage, wherein in the writing frame, the reset stage is between the data writing stage and the light emission stage; and in the idle frame, the reset stage precedes the light emission stage.

17. The driving method for a pixel circuit according to claim 16, wherein the light emission control module comprises a first light emission control unit and a second light emission control unit, and the pixel circuit further comprises an initialization module; and the driving method further comprises:

in the writing frame, writing, by the initialization module, an initialization voltage to a first terminal of the light-emitting module and a control terminal of the driving module in a first initialization stage and a second initialization stage.

18. The driving method for a pixel circuit according to claim 17, wherein the writing frame further comprises a pre-charging stage, and the driving method further comprises:

writing, by the data writing module, a pre-charging voltage to the control terminal of the driving module in the pre-charging stage of the writing frame, wherein in the writing frame, the second initialization stage precedes the first initialization stage, the pre-charging stage is between the second initialization stage and the first initialization stage, and the data writing stage follows the first initialization stage.

19. The driving method for a pixel circuit according to claim 17, further comprising:

in the idle frame, writing, by the initialization module, the initialization voltage to the first terminal of the light-emitting module in the first initialization stage and the second initialization stage.

20. A display panel, comprising:

a pixel circuit, comprising: a data writing module, a driving module, a compensation module, a light emission control module, and a light-emitting module, wherein the data writing module is configured to write a data voltage to a control terminal of the driving module in a data writing stage of a writing frame;

the compensation module is configured to compensate for a threshold voltage of the driving module in the data writing stage of the writing frame; and the light emission control module is configured to be turned on in light emission stages of the writing frame and an idle frame, and the driving module is configured to drive the light-emitting module to emit light in the light emission stages; and the pixel circuit further comprising a reset module, wherein the reset module is electrically connected to a first terminal of the driving module or a second terminal of the driving module, and the reset module is configured to reset potentials of the first terminal of the driving module and the second terminal of the driving module to a fixed reset voltage in a reset stage, wherein in the writing frame, the reset stage is between the data writing stage and the light emission stage; and in the idle frame, the reset stage precedes the light emission stage.

* * * * *